US010178582B2

(12) United States Patent
Asterjadhi et al.

(10) Patent No.: US 10,178,582 B2
(45) Date of Patent: Jan. 8, 2019

(54) APPARATUS AND METHODS FOR FRAME CONTROL DESIGN

(71) Applicant: QUALCOMM Incorporated, San Diego, CA (US)

(72) Inventors: Alfred Asterjadhi, San Diego, CA (US); Simone Merlin, San Diego, CA (US); Santosh Paul Abraham, San Diego, CA (US); Maarten Menzo Wentink, Naarden (NL); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 13/957,366

(22) Filed: Aug. 1, 2013

(65) Prior Publication Data

US 2014/0036775 A1 Feb. 6, 2014

Related U.S. Application Data

(60) Provisional application No. 61/680,198, filed on Aug. 6, 2012, provisional application No. 61/732,019, filed on Nov. 30, 2012, provisional application No. 61/759,325, filed on Jan. 31, 2013, provisional application No. 61/760,604, filed on Feb. 4, 2013, provisional application No. 61/763,410, filed on Feb. 11, 2013, provisional application No. 61/799,477, filed on Mar. 15, 2013.

(51) Int. Cl.
*H04W 28/06* (2009.01)
*H04L 1/18* (2006.01)

(52) U.S. Cl.
CPC ........ *H04W 28/065* (2013.01); *H04L 1/1896* (2013.01); *H04W 28/06* (2013.01)

(58) Field of Classification Search
None
See application file for complete search history.

(56) References Cited

U.S. PATENT DOCUMENTS 7,469,297 B1 * 12/2008 Kostoff, II ........ H04L 29/12839
370/392
8,139,589 B2 3/2012 Choi et al.
9,100,457 B2 8/2015 Hsu
(Continued)

FOREIGN PATENT DOCUMENTS

CN 1340945 A 3/2002
WO WO-2002080488 10/2002
(Continued)

OTHER PUBLICATIONS

International Search Report and Written Opinion—PCT/US2013/053386—ISA/EPO—dated Nov. 22, 2013.
(Continued)

*Primary Examiner* — Hicham B Foud
(74) *Attorney, Agent, or Firm* — Knobbe, Martens, Olson & Bear, LLP

(57) ABSTRACT

Systems, methods, and devices for communicating packets having a plurality of types are described herein. In some aspects, the packets include a MAC header with a frame control field. The sub-fields included in a particular frame control field may be based on the type of information to be communicated to the receiving device.

64 Claims, 26 Drawing Sheets

1400

| bits 2 | 4 | 1 | 1 | 1 | 1 | 1 | 1 | 1 | 3 |
|---|---|---|---|---|---|---|---|---|---|
| Protocol Version | Type | A3 Present | From DS | More Fragments | Power Management | EOSP | More Data | Protected Frame | TID |
| 1402 | 1404 | 1406 | 1408 | 1410 | 1412 | 1414 | 1416 | 1418 | 1420 |

(56) References Cited

U.S. PATENT DOCUMENTS

| | | | |
|---|---|---|---|
| 2004/0170217 A1* | 9/2004 | Ho | H04B 1/715 375/134 |
| 2005/0152358 A1* | 7/2005 | Giesberts | H04L 29/06 370/389 |
| 2005/0152359 A1* | 7/2005 | Giesberts | H04L 1/0083 370/389 |
| 2005/0195858 A1* | 9/2005 | Nishibayashi | H04L 1/1614 370/474 |
| 2006/0092871 A1* | 5/2006 | Nishibayashi | H04L 1/1671 370/328 |
| 2006/0221879 A1* | 10/2006 | Nakajima | H04W 74/0808 370/310 |
| 2007/0242745 A1* | 10/2007 | Choi | H04B 3/54 375/240 |
| 2008/0102845 A1* | 5/2008 | Zhao | H04W 72/085 455/450 |
| 2009/0276646 A1* | 11/2009 | Woo | H04W 76/046 713/310 |
| 2010/0014463 A1* | 1/2010 | Nagai | H04B 7/0695 370/328 |
| 2010/0246600 A1 | 9/2010 | Das et al. | |
| 2011/0069688 A1 | 3/2011 | Zhang et al. | |
| 2011/0149848 A1 | 6/2011 | Ho et al. | |
| 2011/0231577 A1 | 9/2011 | Rezaiifar et al. | |
| 2012/0106531 A1* | 5/2012 | Seok | H04B 7/0452 370/338 |
| 2012/0189123 A1 | 7/2012 | Adachi et al. | |
| 2012/0230317 A1* | 9/2012 | Kim | H04L 1/1854 370/338 |
| 2013/0022032 A1* | 1/2013 | Taghavi Nasrabadi | H04W 28/06 370/338 |
| 2013/0023227 A1* | 1/2013 | Yokoyama | H04W 4/22 455/404.1 |
| 2013/0044607 A1* | 2/2013 | Liu | H04W 8/26 370/242 |
| 2013/0128808 A1 | 5/2013 | Wentink et al. | |
| 2013/0215751 A1* | 8/2013 | Tetzlaff | H04W 28/065 370/235 |
| 2013/0294397 A1* | 11/2013 | Lee | H04B 7/063 370/329 |
| 2013/0301523 A1* | 11/2013 | Asterjadhi | H04W 72/0406 370/328 |
| 2014/0016478 A1* | 1/2014 | Koskela | H04W 48/16 370/241 |
| 2014/0198780 A1* | 7/2014 | Qi | H04W 28/06 370/338 |

FOREIGN PATENT DOCUMENTS

| | | |
|---|---|---|
| WO | WO-2011020108 A3 | 9/2011 |
| WO | WO-2012103381 A1 | 8/2012 |
| WO | WO-2012159082 A2 | 11/2012 |

OTHER PUBLICATIONS

Quan Z., et al., (QUALCOMM Inc): "MAC Header Compression; 11-12-0365-01-00AH-Header-Compression", IEEE SA Mentor; Piscataway, NJ USA, vol. 802.11ah, No. 1, Mar. 15, 2012(Mar. 15, 2012), p. 1-9, XP068038720, [Retrieved on Mar. 15, 2012].

Park, Minyoung, (INTEL) "IEEE P802.11 Wireless LANs Proposed Specification framework for TGah D9.x", Jul. 18, 2012 (Jul. 18, 2012), pp. 1-32, XP055049764, Retrieved from Internet: URL: https://mentor.ieee.org . [Retrieved on Jan. 15, 2013] p. 27-28.

Kim B.S., et al., "Rate-Adaptive MAC Protocol in High-Rate Personal Area Networks," WCNC 2004 / IEEE Communications Society, 2004, pp. 1394-1399.

Merlin S., et al., "Short MAC Header," Qualcomm Inc., doc.:IEEE 802.11-12/0857r0, Jul. 16, 2012, 11 pages.

Chu L., et al., "Frame Header Compression," IEEE 802.11-12/0110r8?May 15, 2012, URL:https://mentor.ieee.org/802.11/dcn/12/11-12-0110-08-00ah-frame-header-compression.ppt, 10 Slides.

Merlin S., et al., "MAC header Compression," IEEE 802.11-12/0646r0, May 4, 2012, URL://mentor.ieee.org/802.11/dcn/12/11-12-0646-00-00ah-compressed-mac-header.pptx, 14 Slides.

Torab P., et al., "Corrections to allocation and flow management," IEEE 802.11-11/0912r0, Jun. 29, 2011, URL:https://mentor.ieee.org/802.11/dcn/11/11-11-0912-00-00ad-corrections-to-allocation-and-flow-management.docx, pp. 1-45.

Li L., et al., "Wireless Network and its Application Technology," Qinghua University Press, Jun. 30, 2004, 7 pages.

* cited by examiner

/300a

| Field Name | Size in Octets | Field Description | |
|---|---|---|---|
| fc | 2 | frame control | 305a |
| dur | 2 | duration/id | 310a |
| a1 | 6 | receiver address | 315a |
| a2 | 6 | transmitter address | 320a |
| a3 | 6 | destination address | 325a |
| sc | 2 | sequence control | 330a |
| qc | 2 | quality of service control | 335a |
| htc | 4 | header type control | 340a |
| ccmp | 8 | counter-mode/cbc-mac protocol | 345a |
| llc/snap | 8 | logical link control/subnetwork access protocol | 350a |
| mic | 8 | message integrity check | 360a |
| fcs | 4 | frame control sequence | 365a |
| TOTAL SIZE: | 58 | | |

| Field Name | Size in Bits | Field Description | |
|---|---|---|---|
| pv | 2 | protocol version | 372 |
| type | 2 | frame type | 374 |
| subtype | 4 | frame subtype | 376 |
| to-ds | 1 | to distribution system | 378 |
| from-ds | 1 | from distribution system | 380 |
| more frag | 1 | more fragments | 382 |
| retry | 1 | retry | 384 |
| pm | 1 | power management | 386 |
| md | 1 | more data | 388 |
| pf | 1 | protected frame | 390 |
| order | 1 | order | 392 |
| TOTAL SIZE: | 16 | | |

| | | Data | 415 | 420 | ACK |
|---|---|---|---|---|---|
| Direction | To-DS/ From-DS | A1 (Rx) | A2 (Tx) | A3 (SA/DA) | A1 (Rx) |
| DL | 01 | AID | BSSID | (SA) | pBSSID |
| UL | 10 | BSSID | AID | (DA) | AID |
| Direct | 00 | RA | AID | | AID |

APPARATUS AND METHODS FOR FRAME CONTROL DESIGN

CROSS-REFERENCE TO RELATED APPLICATIONS

The present application claims priority to provisional U.S. Application Ser. No. 61/680,198, entitled "APPARATUS AND METHODS FOR FRAME CONTROL DESIGN," filed Aug. 6, 2012, assigned to the assignee hereof and incorporated herein by reference in its entirety. The present application further claims priority to provisional U.S. Application Ser. No. 61/732,019, entitled "APPARATUS AND METHODS FOR FRAME CONTROL DESIGN," filed Nov. 30, 2012, assigned to the assignee hereof and incorporated herein by reference in its entirety. The present application further claims priority to provisional U.S. Application Ser. No. 61/759,325, entitled "APPARATUS AND METHODS FOR FRAME CONTROL DESIGN," filed Jan. 31, 2013, assigned to the assignee hereof and incorporated herein by reference in its entirety. The present application further claims priority to provisional U.S. Application Ser. No. 61/760,604, entitled "APPARATUS AND METHODS FOR FRAME CONTROL DESIGN," filed Feb. 4, 2013, assigned to the assignee hereof and incorporated herein by reference in its entirety. The present application further claims priority to provisional U.S. Application Ser. No. 61/763,410, entitled "APPARATUS AND METHODS FOR FRAME CONTROL DESIGN," filed Feb. 11, 2013, assigned to the assignee hereof and incorporated herein by reference in its entirety. The present application further claims priority to provisional U.S. Application Ser. No. 61/799,477, entitled "APPARATUS AND METHODS FOR FRAME CONTROL DESIGN," filed Mar. 15, 2013, assigned to the assignee hereof and incorporated herein by reference in its entirety.

BACKGROUND

Field

The present application relates generally to wireless communications, and more specifically to systems, methods, and devices for compressing medium access control (MAC) headers for communication.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units or data frames. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Accordingly, the header information is transmitted with packets. Such header information may comprise a large portion of a data packet. Accordingly, transmission of data in such packets may be inefficient due to the fact that much of the bandwidth for transmitting data may be used to transmit header information as opposed to the actual data. Thus, improved systems, methods, and devices for communicating packets are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size of a frame header (e.g., medium access control (MAC) header) of a data packet, thereby reducing the overhead in transmitting payloads in data packets.

One aspect of the disclosure provides a method of generating a packet including a frame comprising a medium access control header. The method includes generating the medium access control header including a frame control field storing information indicating a frame type, information indicating a protocol version, and information indicating whether an additional frame is to be transmitted, the frame control field not storing at least one of information indicating a frame sub-type, information indicating the packet is transmitted to a distribution system, retransmission information, and order information. The method further includes transmitting the packet.

Another aspect of the disclosure provides apparatus configured to generate a packet including a frame comprising a medium access control header. The apparatus includes a processor configured to generate the medium access control header including a frame control field storing information identifying a frame type, information indicating a protocol version, and information indicating whether an additional frame is to be transmitted, the frame control field not storing at least one of information indicating a frame sub-type, information indicating a link type over which the packet is transmitted, retransmission information, and order information. The apparatus further includes a transmitter configured to transmit the packet.

Another aspect of the disclosure provides an apparatus configured to generate a packet including a frame comprising a medium access control header. The apparatus includes means for generating the medium access control header including a frame control field storing information indicating a frame type, information indicating a protocol version, and information indicating whether an additional frame is to be transmitted, the frame control field not storing at least one of information indicating a frame sub-type, information indicating the packet is transmitted to a distribution system, retransmission information, and order information. The apparatus further includes means for transmitting the packet.

Another aspect of the disclosure provides a computer-readable medium comprising instructions that when executed by a computer cause the computer to perform a method of communicating in a wireless network, the method comprising: generating a packet including a frame comprising a medium access control header including a frame control field storing information indicating a frame type, information indicating a protocol version, and information indicating whether an additional frame is to be transmitted, the frame control field not storing at least one of information indicating a frame sub-type, information indicating the packet is transmitted to a distribution system, retransmission information, and order information; and transmitting the packet.

BRIEF DESCRIPTION OF THE DRAWINGS

FIG. 3A illustrates an example of contents of a medium access control (MAC) header.

DETAILED DESCRIPTION

Figure 1:
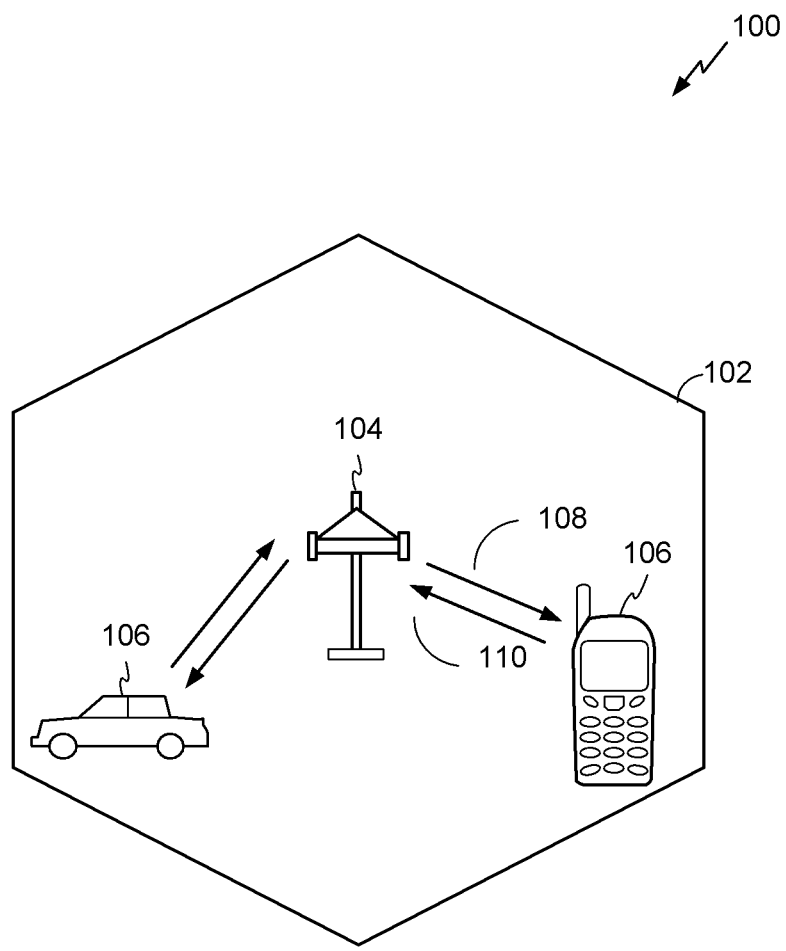
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. Further, in some aspects, STAs 106 may communicate directly with each other and form a direct link (direct) between each other.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. In another example, the functions of the AP 104 described herein may alternatively be performed by one or more of the STAs 106.

Figure 2:
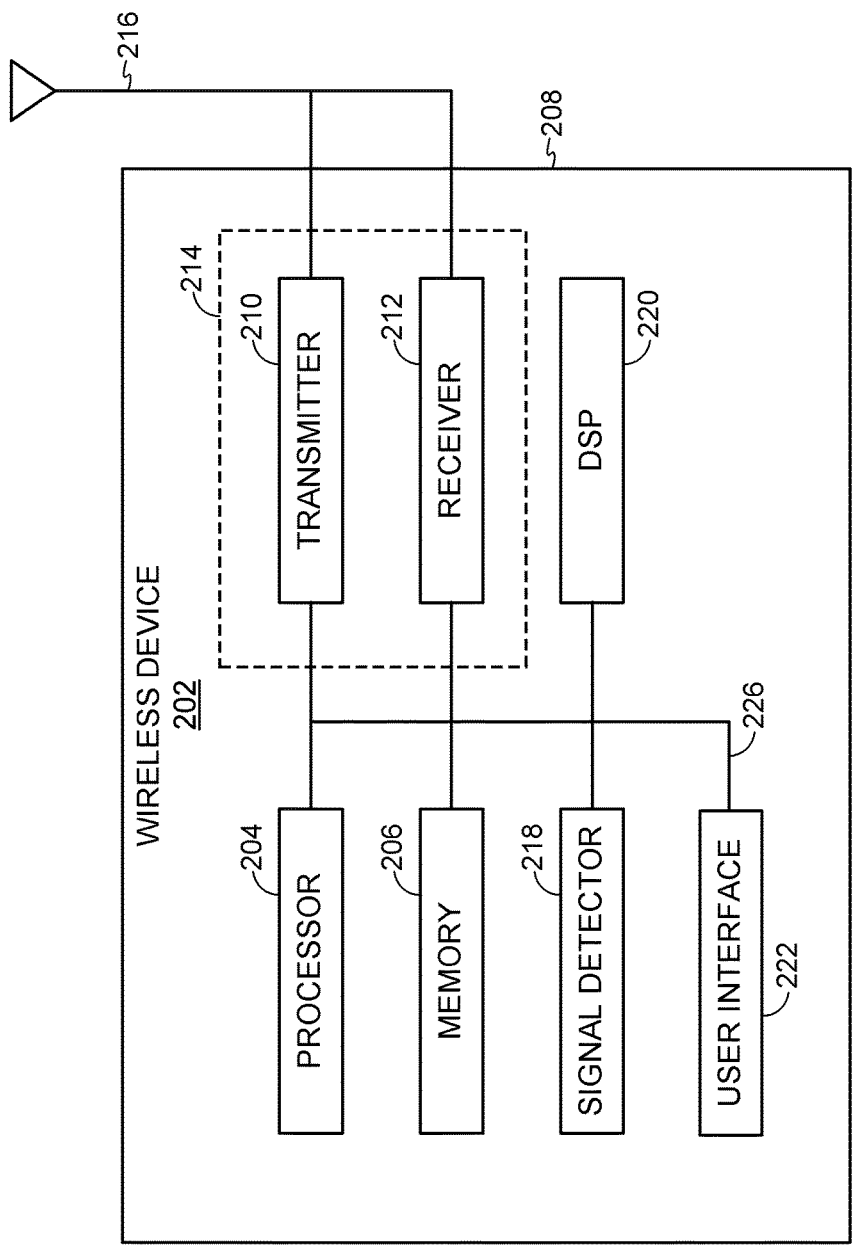
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of medium access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202*t*. Similarly, when the wireless device 202 is configured as a receiving node, it is hereinafter referred to as a wireless device 202*r*. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications having a plurality of MAC header types.

In some aspects, a transmitter receiver pair (e.g., an STA transmitting to an AP over an uplink) may have several "flows" between them. For example, the devices in a wireless network may transmit/receive information between each other. The information may take the form of a series of packets transmitted from a source device (the transmitting device) to a destination device (the received device). The series of packets may be known as a "flow."

As referred to herein, a "flow" can be a series or sequence of packets transmitted from a source device to a destination device that the source devices labels as a flow. A flow may be associated with transmission of particular data from the source device to a destination device, for example, a particular file such as a video file. The packets of a flow, therefore, may share some relationship (at a minimum they are each transmitted from and received at the same devices). In an embodiment, a flow can include a sequence of multiple MAC Protocol Data Units (MPDUs) with common MAC header fields such as, for example, source address, destination address, Basic Service Set Identifier (BSSID), Quality of Service (QoS)/HT control, etc. In various embodiments, the destination device uses certain information about the packets to properly decode the packets of a flow. In certain aspects, the information used to decode a packet is sent in a header portion of the packet. The packets, therefore, may include header information and/or the data to be transmitted from the source device to the destination device.

In a flow, some of the header information discussed with respect to MAC header used to process a packet of the flow may be the same for all packets of the flow. This header information that does not change between packets of a flow may be referred to as, for example, "constant header information" or "common header information."

In certain aspects, instead of transmitting the constant header information in each packet of a flow, the constant header information may only be transmitted by the wireless device 202*t* in a subset of the packets of a flow. For example, the constant header information may be transmitted in only a first packet of the flow or another message. This first packet with the constant header information may be referred to as a "head" frame. The subsequent packets of the flow may be sent without the constant header information. These subsequent packets may include header information that changes from packet to packet of a flow and the data to be transmitted. Subsequent packet with such data may be referred to as "data" frames. The receiver, wireless device 202*r*, of the flow may store the constant header information received in the head frame and use it to process the data frames. Accordingly, the wireless device 202*r* may use a method of associating the data frames of the flow with the head frame.

In certain aspects, the wireless device 202*t* assigns a flow identifier to each flow that it transmits to another device. The flow identifier may be a unique identifier of a flow between a wireless device 202*t* and a wireless device 202*r*. For example, if the wireless device 202*t* and the wireless device 202*r* have multiple flows between each other (in either direction), each flow may be assigned a different flow identifier (e.g., 1, 2, 3, etc.). Accordingly, a device can determine if the packet is for the device based on the a1 and a2 fields and the flow based on the flow identifier. Each of the wireless device 202*t* and the wireless device 202*r* may keep track of the flows between the devices and associated flow identifiers so as not to assign the same flow identifier to multiple flows. Further, in certain aspects, when a flow is completed, as in all the data of a flow is transmitted between the wireless device 202*t* and the wireless device 202*r* and the flow is terminated, the associated flow identifier of the terminated flow may be used for a new flow.

Termination of a flow between the wireless device 202*t* and the wireless device 202*r* may be signaled to the wireless device 202*r* by the wireless device 202*t*. For example, the wireless device 202*t* may indicate within the last data frame of the flow that includes data to send to the wireless device 202r that it is the last data frame and the flow is terminated after receipt of the last data frame. For example, the indication may be via the value of a bit in a frame control field of the data frame.

In another aspect, the wireless device 202t may indicate termination of a flow by transmitting a termination frame or "tail" frame to the wireless device 202r that indicates the flow should be terminated. Accordingly, the wireless device 202t may transmit the last data frame without any indication to the wireless device 202r that it is the last data frame. Further, the wireless device 202t may transmit the tail frame after the last data frame to indicate to the wireless device 202r that the flow is terminated.

In some aspects, the head frames, data frames, and tail frames may comprise MAC protocol data units (MPDUs). In certain aspects, multiple MPDUs may be aggregated into an aggregated-MPDU (A-MPDU). In certain aspects, the data frames of a flow may be transmitted as part of the same A-MPDU. Further, in certain aspects, the head frame, data frames, and tail frame of a flow may be transmitted as part of the same A-MPDU.

Further, in certain aspects, headers may have different fields when security is enabled for the data packet. For example, the packet may have a counter-mode/cbc-mac protocol (CCMP) header when security is enabled. The CCMP header may be part of the MAC header. Normally, the CCMP header includes several packet numbers (PNs) (e.g., PN0, PN1, PN2, PN3, PN4, PN5). The values of PN2, PN3, PN4, and PN5 may not change often. Accordingly, a base PN may be created based on PN2, PN3, PN4, and PN5 (e.g., PN2|PN3|PN4|PN5). The base PN may be sent as part of a message and stored for a pair of communicating devices. The CCMP may therefore not include the PN2, PN3, PN4, and PN5, but only the PN0 and PN1 fields. The receiver of a packet may reconstruct the CCMP header by combining the base PN including the PN2, PN3, PN4, and PN5 stored at the receiver with the received PN0 and PN1 fields. The CCMP header may be reconstructed before decoding of the packet as the encoding of the packet including any CRC type fields such as a MIC field or FCS field may be based on the full CCMP header. Such aspects may be related to aspects described in U.S. Provisional Application No. 61/514,365, filed Aug. 2, 2011, which is hereby expressly incorporated by reference herein.

In some aspects, the wireless device 202r may indicate to the wireless device 202t information (e.g., values for fields of the MAC header) that is stored at the wireless device 202r. The wireless device 202t may then omit such fields from the MAC header in packets sent to the wireless device 202r. For example, a new subtype may be defined (indicated by a value of the subtype field of the frame control field of a MAC header of a data packet) for a data packet that indicates it contains information about, or is itself indicative of, the information stored at the wireless device 202r. A wireless device 202t receiving the data packet which such information may then omit such information in the MAC header of packets sent to the wireless device 202r. The new subtype frame may be used in conjunction with any of the various examples of the MAC header described herein. For example, such information may be omitted from any of the examples of MAC headers described herein. Further, the wireless device 202t may utilize the same data frame subtype (indicated by a value of the subtype field of the frame control field of a MAC header of a data packet) in data packets omitting the information stored at the wireless device 202r for data packets sent to the wireless device 202r. The wireless device 202r receiving the data packets with such subtype may use the subtype as an indicator that the data stored at the wireless device 202r is to be used for values of fields not included in the data packet.

Figure 3:
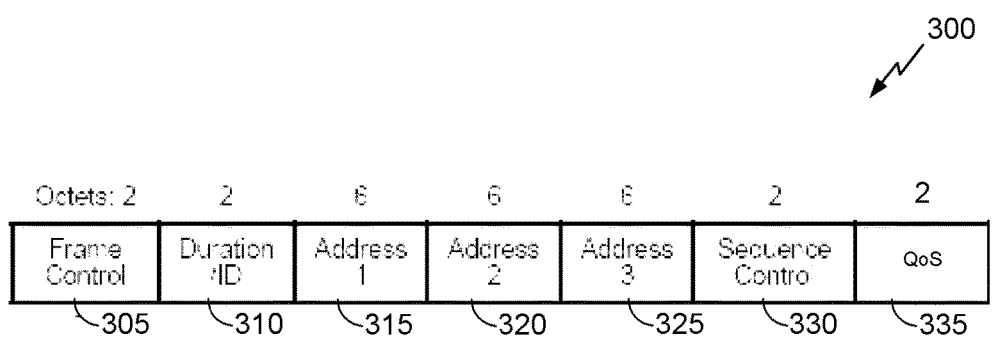
FIG. 3 illustrates an example of a medium access control (MAC) header.

FIG. 3 illustrates an example of a MAC header 300. The MAC header 300 may be a non-compressed MAC header. As shown, the MAC header 300 includes 7 different fields: a frame control (fc) field 305, a duration/identification (dur) field 310, a receiver address (a1) field 315, a transmitter address (a2) field 320, a destination address (a3) field 325, a sequence control (sc) field 330, and a quality of service (QoS) control (qc) field 335. Each of the a1, a2, and a3 fields 315-325 comprises a full MAC address of a device, which is a 48-bit (6 octet) value. FIG. 3 further indicates the size in octets of each of the fields 305-335. Summing the value of all of the field sizes gives the overall size of the MAC header 300, which is 26 octets. The total size of a given packet may be on the order of 200 octets. Therefore, the MAC header 300 comprises a large portion of the overall packet size, meaning the overhead for transmitting a data packet is large.

FIG. 3A illustrates an example of a MAC header 300a, which is a 3-address MAC header using counter-mode with cipher block chaining message authentication code protocol (CCMP) encryption. As shown, the MAC header 300 includes 13 different fields: a frame control (fc) field 305a, a duration/identification (dur) field 310a, a receiver address (a1) field 315a, a transmitter address (a2) field 320a, a destination address (a3) field 325a, a sequence control (sc) field 330a, a quality of service (QoS) control (qc) field 335a, a high throughput (ht) control field 340a, a CCMP (ccmp) field 345a, a logical link control (LLC)/subnetwork access protocol (SNAP) (11c/snap) field 350a, a message integrity check (mic) field 360a, and a frame control sequence (fcs) field 365a.

Figure 3B:
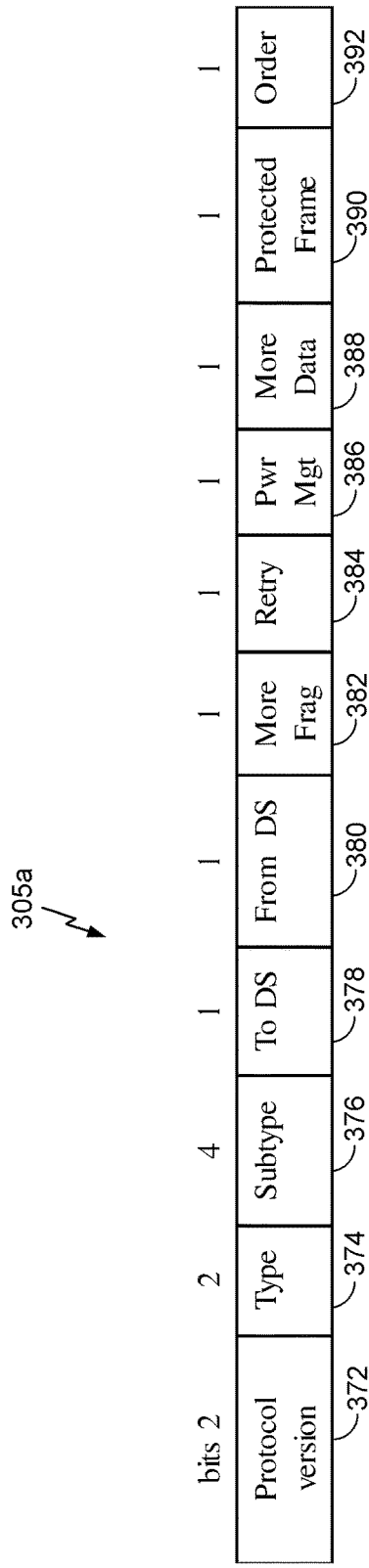
FIG. 3B illustrates an example of contents of a frame control field of a medium access control (MAC) header.

FIGS. 3A and 3B further illustrate the types of data that may be included in the fc field 305a of the MAC header 300a. For example, the fc field 305a may include the following: a protocol version (pv) sub-field 372, a frame type (type) sub-field 374, a frame subtype (subtype) sub-field 376, a to distribution system (to-ds) sub-field 378, a from distribution system (from-ds) sub-field 380, a more fragments (more frag) sub-field 382, a retry sub-field 384, a power management (pm) sub-field 386, a more data (md) sub-field 388, a protected frame (pf) sub-field 390, and an order sub-field 392.

The pv sub-field 372 may be used to indicate the protocol version of the current frame. In the 802.11 standard (e.g., up to and including 802.11ad), a protocol version (pv) sub-field of the fc field is always set to 0, since protocol version 0 (PV0) is the only defined protocol version. Accordingly, the use of other values for the protocol version, i.e., 1 (PV1), 2 (PV2), and 3 (PV3), is not defined. The systems and methods discussed herein may define compressed MAC headers as part of protocol version 1 (PV1), PV2, and/or PV3. The protocol versions may be used interchangeably by devices for communication. For instance, PV0 defining use of a MAC header may be used for setting up a link, negotiating capabilities, and high speed data transfers. Further, PV1, PV2, and/or PV3 defining use of various compressed MAC header may be used for periodic short data transmissions when in power save mode.

In some embodiments, the compressed format MAC header may use the existing protocol version 0 (PV0) or the newly defined protocol version 1 (PV1), PV2, and/or PV3. The use of PV1, PV2, and/or PV3 may avoid a situation where devices attempt to parse a received data packet based on the formatting of a PV0 frame. For example, devices may attempt to match the last 4 octets of the data packet to a frame control sequence (FCS). When it does match, the devices may use the value of the data that is in the position of the duration field to update their network allocation vector (NAV), even though there may not be a duration field at that location in the packet. The odds for such a false positive detection to occur may be high enough to cause glitches or jitter at some nodes, which may warrant the use of PV1, PV2, and/or PV3 for the compressed MAC header formats.

The frame type sub-field 374 is two bits in length and may be used to indicate the frame type and the function of the frame. In some embodiments, the frame type sub-field 374 may indicate that the frame is a control frame, a data frame, or management frame. In some embodiments, the frame type sub-field 374 may indicate that the frame is a beacon, a PNC selection, an association request, an association response, a disassociation request, an acknowledgment, a command, etc. The subtype sub-field 376 may be used to indicate the specific function to perform for the associated frame type. There may be multiple sub-type sub-fields for each frame type. The to-ds sub-field 378 may be used to indicate whether the frame is going to or is transmitted to a distributed system (ds). The from-ds sub-field 380 may be used to indicate whether the frame is exiting from the ds. In some embodiments, the to-ds sub-field 378 and the from-ds sub-field 380 may be used only in data frame types. The more frag sub-field 382 may be used to indicate whether one or more additional fragments of the frame are to be transmitted. The retry sub-field 384 may be used to indicate whether or not the current frame is being retransmitted. For example, the retry sub-field 384 may be set to 1 in a frame that is a retransmission of an earlier frame. The power management (pm) sub-field 386 may be used to indicate a power management state. For example, the pm sub-field 386 may indicate whether an STA is in an active mode or a power-save mode. The more data (md) sub-field 388 may be used to indicate whether an additional frame is to be transmitted. For example, the md sub-field 388 may be used to indicate to a receiving STA that is in power-save mode that the AP has more frames buffered for delivery to the STA, and thus more frames to transmit to the STA. The protected frame (pf) sub-field 390 may be used to indicate whether frame protection is present. For example, the pf sub-field 390 may indicate whether or not encryption and/or authentication are used in the frame. In some embodiments, for frames that have encryption and authentication, the pf sub-field 390 may be set to indicate encryption is present and the subtype sub-field 376 may be set to indicate that authentication is present. The order sub-field 392 may be used to indicate order information. For example, the order sub-field 392 may be used to indicate that all received data frames must be processed in order.

FIG. 3A further indicates the size in octets of each of the fields 305a-365a. Summing the value of all of the field sizes gives the overall size of the MAC header 300a, which is 58 octets. The total size of a given packet may be on the order of 200 octets. Therefore, the MAC header 300a comprises a large portion of the overall packet size, meaning the overhead for transmitting a data packet is large.

Accordingly, systems and methods for using MAC headers of reduced size (compressed MAC headers) for data packets by are described herein. The use of such compressed MAC headers allows for less space in a data packet to be used by the MAC header, thereby reducing the overhead needed to transmit the payload in a data packet. Thus, less data needs to be transmitted overall. Less transmission of data can increase the speed with which data is transmitted, can reduce the use of bandwidth by a transmitter, and can reduce the power needed for transmission as fewer resources are used to transmit less data.

Figures 4, 4A:
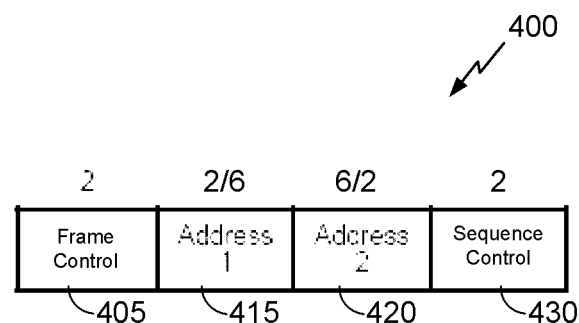
FIG. 4 illustrates an example of a compressed MAC header.
FIG. 4A illustrates examples of the type of data in the fields of the compressed MAC header of FIG. 4 for a data packet, and the data for a corresponding acknowledgement according to one aspect of the MAC header of FIG. 4.

FIG. 4 illustrates an example of a compressed MAC header 400. As shown, the MAC header 400 includes 4 different fields: a frame control (fc) field 405, a first address (a1) field 415, a second address (a2) field 420, and a sequence control (sc) field 430. FIG. 4 further indicates the size in octets of each of the fields 405-430. Summing the value of all of the field sizes gives the overall size of the MAC header 400, which is 12 octets (a 54% reduction in size from the MAC header 300). As shown, one of the a1 field 415 and the a2 field 420 is 6 octets in length, while the other is 2 octets in length as further discussed below. The various fields of the MAC header 400 may be utilized according to several different aspects described below.

As shown in the MAC header 400, the dur field 310 may be omitted. Normally, a device receiving a data packet will decode at least the dur field 310, which indicates a time the device should not transmit so there are no interfering transmissions during the transmit opportunity. Instead of the dur field 310, devices may be configured to not transmit data after receiving a data packet that requires an acknowledgement until a time for such acknowledgement has passed. Such acknowledgement may be an ACK or BA, indicating the packet has been received. The devices may only be configured to defer transmission until an ACK may have been received for the packet if a field (e.g., an ACK policy field) in the packet indicates that the device should defer until an ACK is received. The field may be included in the MAC header or PHY header of the packet. The transmission of the response frame may be hidden for a STA that observes the data packet causing the response frame to be sent, but the indication in the data packet that an ACK may be present causes the observing STA to defer after the end of the data packet until the response frame may have been transmitted by the STA that is the destination of the data packet.

FIG. 4A illustrates examples of the type of data in the fields of the compressed MAC header 400 for a data packet, and the data for a corresponding acknowledgement according to one aspect of the MAC header 400. As shown, in the figure, the columns labeled "Data" correspond to the information sent as part of a data packet (as shown, the information for the a1 field 415 and the a2 field 420 and optionally an a3 field). The column labeled "ACK" corresponds to the information sent in a corresponding ACK. The column labeled "Direction" indicates the direction or link type over which the data packet is sent. In some aspects, instead of using a globally unique identifier for a device (e.g., MAC address) for both the a1 field 415 and the a2 field 420 as is used in the MAC header 300, one of the a1 field 415 or the a2 field 420 uses a local identifier, such as an access identifier (AID), that uniquely identifies a device in a particular BSS, but does not necessarily uniquely identify the device globally. As shown, if the MAC header 400 is part of a data packet transmitted over a downlink from an AP to an STA, the a1 field 415 includes a receiver AID (R-AID) and the a2 field 420 includes a BSSID. The R-AID is the AID of the STA receiving the packet. The R-AID may comprise 13-bits allowing for 8192 STAs to be addressed uniquely in a given BSS by their R-AIDS. The 13-bit R-AID may allow for approximately 6000 STAs and 2192 other values, such as an indication that the packet is a multicast or broadcast packet, the type of the multicast or broadcast packet (i.e. a beacon), possibly in combination with a beacon change sequence number that indicates the version of the beacon that is comprised within the packet. The BSSID is the MAC address of the AP and may comprise 48 bits. In some aspects, the BSSID may be replaced with a compressed version of the BSSID. For example, a compressed version of the BSSID may be an AID (e.g., 2 bytes instead of 6 bytes) which the AP may auto-assign to itself during network setup. The AID may be carefully selected in order to guarantee that other APs in the area do not have the same AID. The STA receiving the packet with the MAC header 400 may uniquely determine whether or not it is the intended recipient of the packet based on the a1 field 415 and the a2 field 420. In particular, the STA can check to see if the R-AID matches the R-AID of the STA. If the R-AID matches, the STA may be the intended recipient of the packet. This alone may not uniquely determine whether the STA is the recipient, as STAs in different BSSs may have the same R-AID. Accordingly, the STA may further check to see if the a2 field 420 includes the BSSID of the AP (i.e., BSS) that the STA is associated with. If the BSSID matches the association of the STA and the R-AID, the STA uniquely determines it is the intended recipient of the packet and may further process the packet. Otherwise, the STA may ignore the packet.

If the STA determines it is the intended recipient, it may send an acknowledgment message (ACK) to the AP to indicate successful receipt of the packet. In one aspect, the STA may include all or a portion of the a2 field 420 such as a partial BSSID (pBSSID) comprising less than all the bits of the BSSID (e.g., 13 bits) in a MAC or physical layer (PHY) header of the ACK. In some aspects, the pBSSID may be a compressed version of the BSSID. In other aspects, the compressed version of the BSSID may be a pBSSID. Accordingly, in order to produce the ACK, the STA need only directly copy bits from the received MAC header 400, which reduces processing. The AP receiving the ACK may determine the ACK is from the STA if it is received soon after a certain time period (e.g., a short inter frame space (SIFS)) from transmission of the initial packet as it is unlikely the AP will receive two ACKs with the same information in the time period. In another aspect, the STA may transmit all or a portion of a cyclic redundancy check (CRC) from the packet or a hash of all or a portion of the packet in the MAC or PHY header of the ACK. The AP may determine the STA sent the ACK by checking for such information. Since such information is random for each packet, it is highly unlikely two ACKs with the same information will be received after the time period by the AP.

Further, the packet transmitted by the AP to the STA may optionally include a source address (SA) used for indicating a routing device to be used to route the packet. The MAC header 400 may further include a bit or field indicating whether the SA is present in the MAC header 400. In one aspect, the order bit of the frame control field of the MAC header 400 may be used to indicate presence or absence of the SA. In another aspect, two different subtypes may be defined for the compressed MAC header 400, one subtype including an a3 field such as the SA and one subtype not including the a3 field such as the SA. The subtype may be indicated via the value of a subtype field of the frame control field of the MAC header 400. In some aspects, the AP and STA may transmit information regarding the SA as part of another packet and omit the SA from the data packet. The STA may store the SA information and use it for all packets sent from the AP, or for certain packets that have a particular identifier associated with them (e.g., a flow ID) as discussed later.

As shown, if the MAC header 400 is part of a data packet transmitted over an uplink from an STA to an AP, the a1 field 415 includes a BSSID of the AP and the a2 field 420 includes an AID of the STA, which may be referred to as a transmitter AID (T-AID). The AP may similarly determine whether it is the intended recipient and the transmitter of the data packet based on the BSSID and the T-AID as discussed above. In particular, the AP can check to see if the BSSID matches the BSSID of the AP. If the BSSID matches, the AP is the intended recipient of the packet. Further, the AP can determine the transmitter of the packet based on the T-AID as only one STA in the BSS of the AP has the T-AID.

If the AP determines it is the intended recipient, it may send an acknowledgment message (ACK) to the STA to indicate successful receipt of the packet. In one aspect, the AP may include all or a portion of the a2 field 420 such as the T-AID in a MAC or physical layer (PHY) header of the ACK. Accordingly, in order to produce the ACK, the AP need only directly copy bits from the received MAC header 400, which reduces processing. The STA receiving the ACK may determine the ACK is from the AP if it is received soon after a certain time period (e.g., a short inter frame space (SIFS)) from transmission of the initial packet as it is unlikely the STA will received two ACKs with the same information in the time period. In another aspect, the AP may transmit all or a portion of a cyclic redundancy check (CRC) from the packet or a hash of all or a portion of the packet in the MAC or PHY header of the ACK. The STA may determine the AP sent the ACK by checking for such information. Since such information is random for each packet, it is highly unlikely two ACKs with the same information will be received after the time period by the STA.

In some aspects, the address field of the ACK may include one or more global addresses (e.g., a MAC address, BSSID) that uniquely identifies a transmitter and/or receiver of the ACK globally (e.g., in most any network). In some aspects, the address field may include one or more local addresses (e.g., an association identifier (AID)) that uniquely identifies a transmitter and/or receiver of the ACK locally (e.g., in a local network such as in a particular BSS). In some aspects, the address field may include a partial or non-unique identifier (e.g., a portion of a MAC address or AID) that identifies a transmitter and/or receiver of the ACK. For example, the address field may be one of the AID, MAC address, or a portion of the AID or MAC address of the transmitter and/or receiver of the ACK that is copied from the frame being acknowledged by the ACK.

In some aspects, the identifier field of the ACK may identify the frame being acknowledged. For example, in one aspect, the identifier field may be a hash of the content of the frame. In another aspect, the identifier field may include all of or a portion of the CRC (e.g., the FCS field) of the frame. In another aspect, the identifier field may be based on all of or a portion of the CRC (e.g., the FCS field) of the frame and all or a portion of a local address (e.g., AID of an STA). In another aspect, the identifier field may be a sequence number of the frame. In another aspect, the identifier field may include one or more of the following in any combination: one or more global addresses of the transmitter/receiver of the ACK, one or more local addresses of the transmitter/receiver of the ACK, one or more portions of global addresses of the transmitter/receiver of the ACK, or one or more portions of local addresses of the transmitter/receiver of the ACK. For example, the identifier field may include a hash of a global address (e.g., BSSID, MAC address of an AP) and a local address (e.g., AID of an STA) as shown in Equation 1.

$$(dec(AID[0:8])+dec(BSSID[44:47]\ XOR\ BSSID[40:43])2^5)\ mod\ 2^9 \quad (1)$$

where dec( ) is a function that converts a hexadecimal number to a decimal number. Other hash functions based on the same inputs may be implemented without departing from the scope of the disclosure.

In some aspects the frame for which the ACK is sent in response may include a token number set by the transmitter of the frame. The transmitter of the frame may generate the token number based on an algorithm. In some aspects, the token number generated by the transmitter may have a different value for each frame sent by the transmitter. In such aspects, the receiver of the frame may use the token number in the identifier field of the ACK to identify the frame being acknowledged such as by setting the identifier as the token number or computing the identifier based at least in part on the token number. In some aspects, the identifier field may be computed as a combination of the token number with at least one of the following: one or more global addresses of the transmitter/receiver of the ACK, one or more local addresses of the transmitter/receiver of the ACK, one or more portions of global addresses of the transmitter/receiver of the ACK, one or more portions of local addresses of the transmitter/receiver of the ACK, or all or a portion of a CRC of the frame. In some other aspects the token number may be included in another field of the ACK and/or frame being acknowledged such as a SIG field and/or a control information (Control Info) field. In some aspects the token may be derived from a scrambling seed in a SERVICE field, which may come after a PHY preamble, of the frame being acknowledged.

By the techniques described above, the response frame (e.g., ACK, CTS, BA) can echo a value, such as a FCS or random number (e.g., packet ID), in the initiating frame (e.g., data, RTS, BAR). The echo value may be based, at least in part, on the scrambler seed. The echoed value may be transmitted in the scrambler seed field of the response frame. The echoed value may be transmitted in the SIG field of the response frame. The echoed value may be transmitted in the MPDU included in the response frame.

In some implementations, it may be desirable for the frame check sum (FCS) of the initiating frame (e.g., data, RTS, BAR) to be based on or include a random number (e.g., packet ID). This value may be used as the echo value. In such implementations, the echo value may be included in the scrambled seed of the initiating frame. Accordingly, the FCS may be echoed in full or in part in the response frame (e.g., ACK, CTS, BA).

Through the use of the echo value, by including an echo value, the response frame may not include the station identifier of the initiating frame. One or more of the addressing schemes on an initiating frame (e.g., Data, RTS, BAR, etc.) may be used with the response frame (e.g., ACK, CTS, BA, etc.) that echoes the FCS or a packet ID of the initiating frame, but not a station identifier. This may improve communications as described above.

Further, the packet transmitted by the STA to the AP may optionally include a destination address (DA) used for indicating a routing device to be used to route the packet. The MAC header 400 may further include a bit or field indicating whether the DA is present in the MAC header 400. In one aspect, the order bit or an "a3 present" bit of the frame control field of the MAC header 400 may be used to indicate presence or absence of the DA. In another aspect, two different subtypes may be defined for the compressed MAC header 400, one subtype including an a3 field such as the DA and one subtype not including the a3 field such as the DA. The subtype may be indicated via the value of a subtype field of the frame control field of the MAC header 400. In some aspects the values of the subtype indicating presence or omission of the DA are the same values as used to indicate presence or omission of the SA for DL packets. In some aspects, the AP and STA may transmit information regarding the DA as part of another packet and omit the DA from the data packet. The AP may store the DA information and use it for all packets sent from the STA, or for certain packets that have a particular identifier associated with them (e.g., a flow ID).

As shown, if the MAC header 400 is part of a data packet transmitted over a direct link from a transmitting STA to a receiving STA, the a1 field 415 includes a full receiver address (RA) of the receiving STA and the a2 field 420 includes an AID of the transmitting STA, which may be referred to as the transmitter AID (T-AID). The receiving STA may similarly determine whether it is the intended recipient and the transmitter of the data packet based on the RA and the T-AID as discussed above. In particular, the receiving STA can check to see if the RA matches the RA of the receiving STA. If the RA matches, the receiving STA is the intended recipient of the packet. Further, the receiving STA can determine the transmitter of the packet based on the T-AID as only one transmitting STA in the BSS of the receiving STA has the T-AID.

If the receiving STA determines it is the intended recipient, it may send an acknowledgment message (ACK) to the transmitting STA to indicate successful receipt of the packet. In one aspect, the receiving STA may include all or a portion of the a2 field 420 such as the T-AID in a MAC or physical layer (PHY) header of the ACK. Accordingly, in order to produce the ACK, the receiving STA need only directly copy bits from the received MAC header 400, which reduces processing. The transmitting STA receiving the ACK may determine the ACK is from the receiving STA if it is received soon after a certain time period (e.g., a short inter frame space (SIFS)) from transmission of the initial packet as it is unlikely the transmitting STA will receive two ACKs with the same information in the time period. In another aspect, the receiving STA may transmit all or a portion of a cyclic redundancy check (CRC) from the packet or a hash of all or a portion of the packet in the MAC or PHY header of the ACK. The transmitting STA may determine the receiving STA sent the ACK by checking for such information. Since such information is random for each packet, it is highly unlikely two ACKs with the same information will be received after the time period by the transmitting STA.

Whether the packet is sent as part of a downlink, uplink, or direct link may be indicated by certain bits in the MAC header 400. For example, the to-distribution system (to-ds) and from-ds fields of the fc field 405 may be used to indicate the link type used for sending the packet (e.g., 01 for the downlink, 10 for the uplink, and 00 for the direct link) as shown in the column labeled To-DS/From-DS. Accordingly, the recipient of a packet may determine the length (e.g., 2 octets or 6 octets) of the a1 field 415 and a2 field 420 based on the type of address that is expected in each field and thus determine the address contained in each field.

In another aspect, instead of indicating whether the packet is a part of a downlink, uplink, or direct link, 1 bit (e.g., a 1 bit substitute for the to-ds/from-ds field) may be used in the MAC header 400 to indicate which type of address is in each of the a1 field 415 and a2 field 420. For example, one value of the bit may indicate the a1 field 415 is the address of the receiver of the data packet and the a2 field 420 is the address of the transmitter of the data packet. The other value of the bit may indicate the a1 field 415 is the address of the transmitter of the data packet and the a2 field 420 is the address of the receiver of the data packet.

Furthermore, systems and methods for removing or modifying certain sub-fields of the frame control field of the MAC header are described herein. Removal or modification of sub-fields of the frame control field allow further compression of MAC headers and thus allows for less space in a data packet to be used by the MAC header.

Compression of MAC headers may be performed by removing or modifying certain sub-fields of the frame control field of the MAC header. The compressed MAC header may then be sent from the wireless device 202*t* to the wireless device 202*r*. Removal or modification of the sub-fields may be based on the information that needs to be communicated to the wireless device 202*r* of the data packet. For example, the wireless device 202*r* may not need all the information in the frame control field 305*a* of the MAC header 300 to receive and process the data packet. For example, in some cases the receiver may already have some of the information stored in memory that would be transmitted in the frame control field 305*a*. In one case, the wireless device 202*r* may have received that information in a previously received data packet from the wireless device 202*t*, such as in the MAC header of the previous data packet or a messaging packet. In another case, the wireless device 202*r* may have such information pre-programmed such as at the time of manufacture, or through communication with another device. In some aspects, the wireless device 202*r* may indicate to the wireless device 202*t* information (e.g., values for fields of the MAC header) that is stored at the wireless device 202*r*. The wireless device 202*t* may then omit such information from the sub-fields of the frame control field, or other fields of the MAC header, in packets sent to the wireless device 202*r*.

In yet another embodiment, the wireless device 202*r* may not perform certain functions that would require the use of sub-fields that have been removed, for example in cases where such functionality is not needed.

The omitted sub-fields may be replaced with "reserved" sub-fields. The reserved sub-fields may be used for transmitting information that is needed by the receiver to process the frame. Below are described some of the sub-fields that may be removed or modified and replaced with reserved sub-fields, and information that may be included in the reserved sub-fields.

Figure 5:
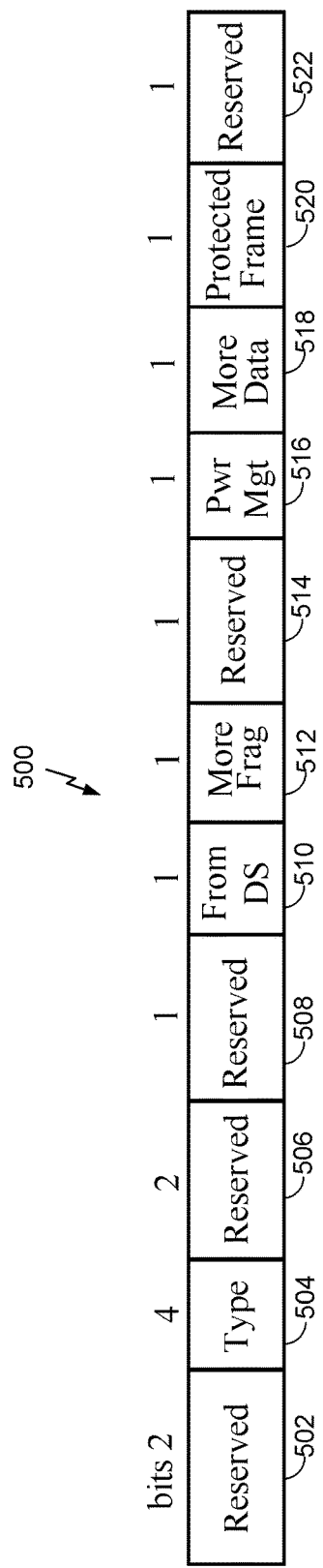
FIGS. 5-8 and 8A illustrate examples of frame control fields of MAC headers.

FIG. 5 illustrates an example of a frame control (fc) field 500 of a MAC header (e.g., MAC header 300) and the types of data that may be included in the fc field 500. The fc field 500 includes the following sub-fields: a reserved sub-field 502, a frame type (type) sub-field 504, a reserved sub-field 506, a reserved sub-field 508, a from distribution system (from-ds) sub-field 510, a more fragments (more frag) sub-field 512, a reserved sub-field 514, a power management (Pwr Mgt) sub-field 516, a more data sub-field 518, a protected frame (pf) sub-field 520, and a reserved sub-field 522. The bits of the reserved sub-fields 502, 506, 508, 514, and/or 522 may be reserved for storing information that is needed by the receiver of the frame in order to process the frame. In some embodiments, an entire reserved sub-field may be used for a single set of information. In other embodiments, if more than one bit is available in the reserved sub-field, multiple sets of information may be stored in the reserved sub-field (e.g., one set of information as one bit and another set of information as another bit).

In some aspects, the type sub-field 504 may be used to indicate to the receiver of the data unit whether the data unit includes an aggregated medium access control (MAC) level service data unit (A-MSDU) or a single MSDU. For example, a value of 1 for the type sub-field 504 may indicate that the data unit includes an A-MSDU and a value of 0 may indicate that the data unit is a MSDU.

The fc field 500 may optionally or selectively not store some of the information that is included in the fc field 305*a* included in the MAC header 300. The sub-fields that normally include the information may be replaced with the reserved sub-fields 502, 506, 508, 514, and/or 522. For example, the fc field 500 may not store any one or more of information indicating a protocol version (e.g., protocol version sub-field 372), information indicating a frame subtype (e.g., subtype sub-field 376), information indicating that a packet is transmitted to a distribution system (e.g., To-DS sub-field 378), retransmission information (e.g., retry sub-field 384), and order information (e.g., order sub-field 392*a*). As illustrated in FIG. 5, the reserved sub-fields 502, 506, 508, 514, and/or 522 replace the protocol version sub-field 372, the subtype sub-field 376, the To-DS sub-field 378, the retry sub-field 384, and the order sub-field 392*a*. In some embodiments, the one or more (or part) of the reserved bits may be shifted to the right of the control frame field.

FIGS. 6-14*e* illustrate aspects of the frame control field that include certain sub-fields and do not include other sub-fields as discussed above, and that can be used for communication between the wireless device 202*t* and the wireless device 202*r*. In particular, FIGS. 6-14*e* illustrate examples of the type of information that may be stored in the reserved sub-fields 502, 506, 508, 514, and/or 522 of FIG. 5.

Figure 6:
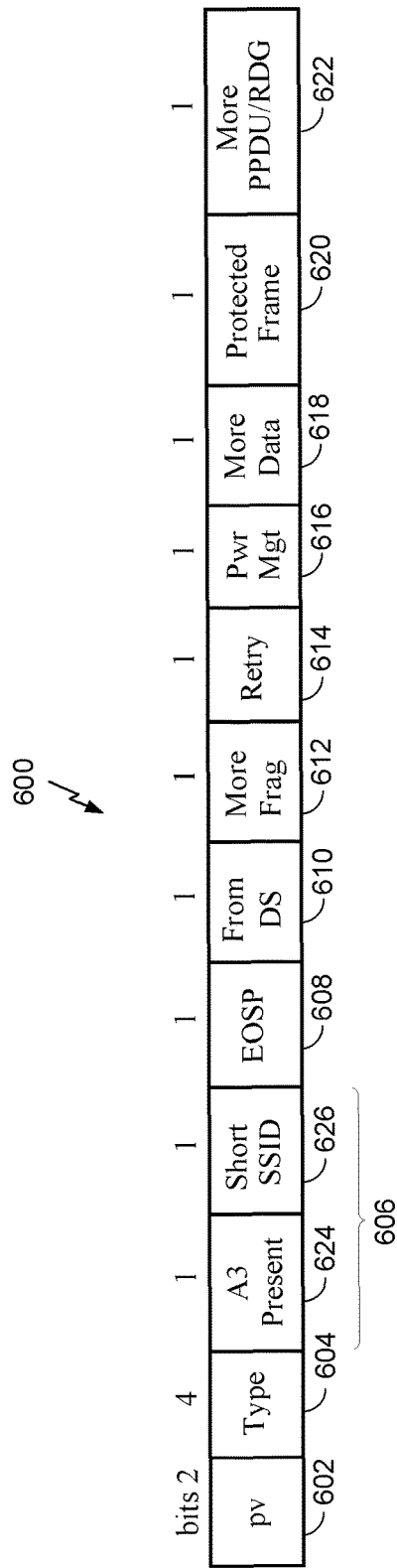

FIG. 6 illustrates a fc field 600 that includes the following sub-fields: a protocol version (pv) sub-field 602, a frame type (type) sub-field 604, an a3 present sub-field 624, a short service set identifier (short SSID) sub-field 626, an end of service period (eosp) sub-field 608, a from-ds sub-field 610, a more frag sub-field 612, a retry sub-field 614, a Pwr Mgt sub-field 616, a more data sub-field 618, a protected frame (pf) sub-field 620, and a more physical (PHY) layer protocol data unit/reverse direction grant (more ppdu/rdg) sub-field 622. The pv sub-field 602, the eosp sub-field 608, the retry sub-field 614, and the more ppdu/rdg sub-field 622 are stored in the reserved sub-fields 502, 508, 514, and 522, respectively. The a3 present sub-field 624 and the short SSID sub-field 626 are stored in the reserved sub-field 606, corresponding to the reserved sub-field 506 of FIG. 5. In some embodiments, some of the sub-fields may not be included in the frame control field. For example, the bits that were previously included in these sub-fields may be reserved. In another example, the frame control field may include the remaining sub-fields shifted to the left in order to allow all reserved bits to be contiguous at the end of the frame control field.

As described above, the pv sub-field 602 may be used to indicate the protocol version of the current frame. For example, the pv sub-field 602 may be used to define different compressed MAC headers as part of the different protocol versions. The protocol versions may be used interchangeably by devices for communication. For instance, PV0 defining use of a non-compressed MAC header may be used for setting up a link, negotiating capabilities, and high speed data transfers. Further, PV1, PV2, and/or PV3 defining use of various compressed MAC header may be used for periodic short data transmissions when in power save mode.

The eosp sub-field 608 may be used to indicate that an end of a service period is to occur. The end of service period may occur if data buffered at an AP for a STA will no longer be transmitted to the STA or if there is no additional data buffered at the AP. In some embodiments, the eosp sub-field 608 may be included in a frame control field of a quality of service data frame. In some embodiments, the bit of the eosp sub-field 608 may be set to 0 in all frames except for the final frame of a service period, or flow, between a STA and an AP. In the final frame of the service period, the eosp sub-field 608 may be set to 1 in order to indicate that the service period is ended.

As described above, the retry sub-field 614 may be used to indicate whether or not the current frame is being retransmitted. For example, the retry sub-field 384 may be set to 1 in a frame that is a retransmission of an earlier frame.

The more ppdu/rdg sub-field 622 may indicate whether additional sub-frames are to be transmitted and/or whether a reverse direction is granted. A ppdu may include a PHY preamble and header and a MAC protocol data unit. In some embodiments, when multiple sub-frames of a data unit are transmitted to a receiver, the bit of the more ppdu/rdg sub-field 622 may be set to 1 to indicate there will be one or more sub-frames to follow the current sub-frame. The bit of the more ppdu/rdg sub-field 622 may be set to 0 to indicate that the current sub-frame is the last sub-frame of the data unit. In some embodiments, the ppdu/rdg sub-field may indicate that a reverse direction is granted to the receiver of the frame. For example, for devices that support a reverse direction protocol, a device is specified as the device that has permission to send a reverse direction grant (RDG) to a receiver. The device may transmit its permission to the receiver using the RDG in the bit of the ppdu/rdg sub-field and may grant permission to the receiver by setting the bit to 1. When the receiver receives the frame with the ppdu/rdg sub-field set to 1, it may determine whether it will send to the device more frames immediately following the one it just received. If the receiver determines that a data frame will follow the acknowledgement, the receiver may transmit an acknowledgement for the received frame in which the bit of the ppdu/rdg sub-field is set to 1. In response to determining that the bit of the ppdu/rdg sub-field of the ACK is set to 1, the device may wait for the transmission from the receiver.

The a3 present sub-field 624 may indicate whether a destination address is present in the packet. For example, in some aspects, an a3 present sub-field may be added to indicate whether an a3 field (indicating $3^{rd}$ address identifying another device) is included in the compressed MAC header. The destination address may be used in cases where the wireless device 202t transmits a data packet to the wireless device 202r via another device (e.g., a router) and indicates the address of the other device as the destination address. For instances where the wireless device 202t transmits directly to the wireless device 202r, the a3 field can be removed from the MAC header 300 or 300a. Thus, the a3 present sub-field 624 may be added to the fc frame to indicate whether or not the a3 field is present in the MAC header.

The short SSID sub-field 626 may indicate an identification (ID) of the wireless network (e.g., a network service set). The service set identifier (SSID) is the name that identifies the wireless network and may be configured on the AP or on an initial wireless client (e.g., for an ad hoc network). For example, when the frame is from a STA in a basic service set, the ID may be the MAC address of the AP. In some embodiments, the identification of the network service set may include a hash of a short service set identifier. In some embodiments, the short SSID may be an AID that the AP has associated to itself during network setup. For example, the AID may be a short BSSID that may be 13 bits long and randomly selected to ensure that no other APs in the area have the same short BSSID.

Figure 7:
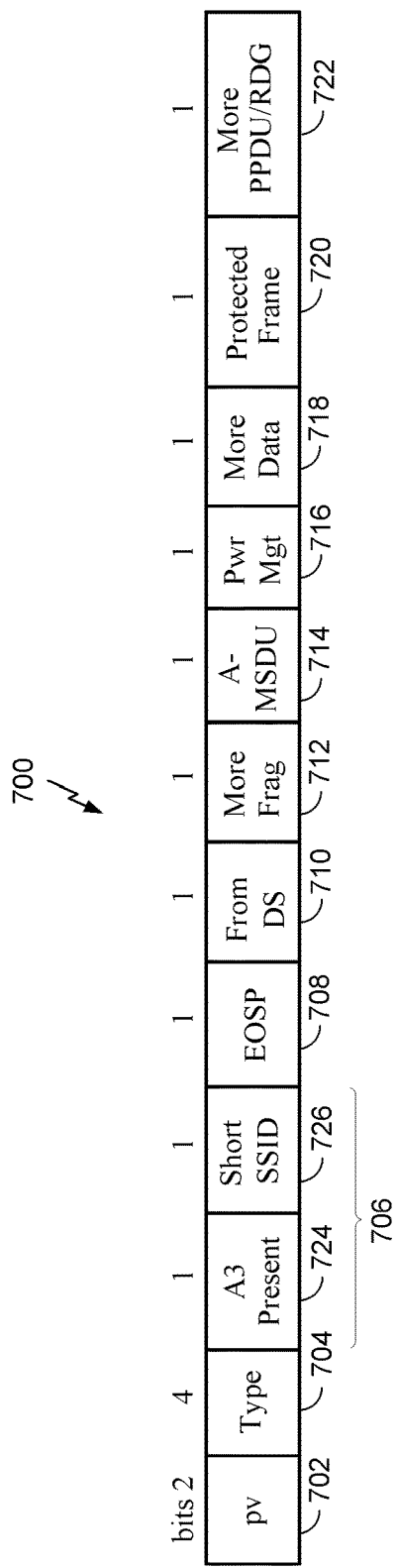

FIG. 7 illustrates another example of the type of information that may be stored in the reserved sub-fields 502, 506, 508, 514, and/or 522 of FIG. 5. As illustrated in FIG. 7, the fc field 700 includes the following sub-fields: a protocol version (pv) sub-field 702, a frame type (type) sub-field 704, an a3 present sub-field 724, a short SSID sub-field 726, an eosp sub-field 708, a from-ds sub-field 710, a more frag sub-field 712, an aggregated medium access control (MAC) level service data unit (A-MSDU) sub-field 714, a Pwr Mgt sub-field 716, a more data sub-field 718, a pf sub-field 720, and a more ppdu/rdg sub-field 722. In the fc field 700, the pv sub-field 702, the eosp sub-field 708, the A-MSDU sub-field 714, and the more ppdu/rdg sub-field 722 are stored in the reserved sub-fields 502, 508, 514, and 522, respectively. Similar to FIG. 6, the a3 present sub-field 724 and the short SSID sub-field 726 are stored in the reserved sub-field 706, corresponding to the reserved sub-field 506 of FIG. 5.

The fc field 700 is different than the fc field 600 in that there is no retry sub-field. Instead, there is an aggregated MAC level service data unit (A-MSDU). The use of different sub-fields may be based on the different information that needs to be communicated to the different receiving devices of the data packet.

The A-MSDU sub-field 714 may indicate that an aggregated service data unit is present. An aggregated service data unit, such as a MAC level service data unit, allows the aggregation of multiple frames of one protocol (e.g., Ethernet) into a single frame of another protocol (e.g., 802.11). Thus, multiple MSDUs may be aggregated into a single A-MSDU. Each of the MSDUs may share the same MAC header. The A-MSDU sub-field 714 bit may be set to 1 in order to indicate to the receiver of the frame that an A-MSDU is present.

Figure 8:
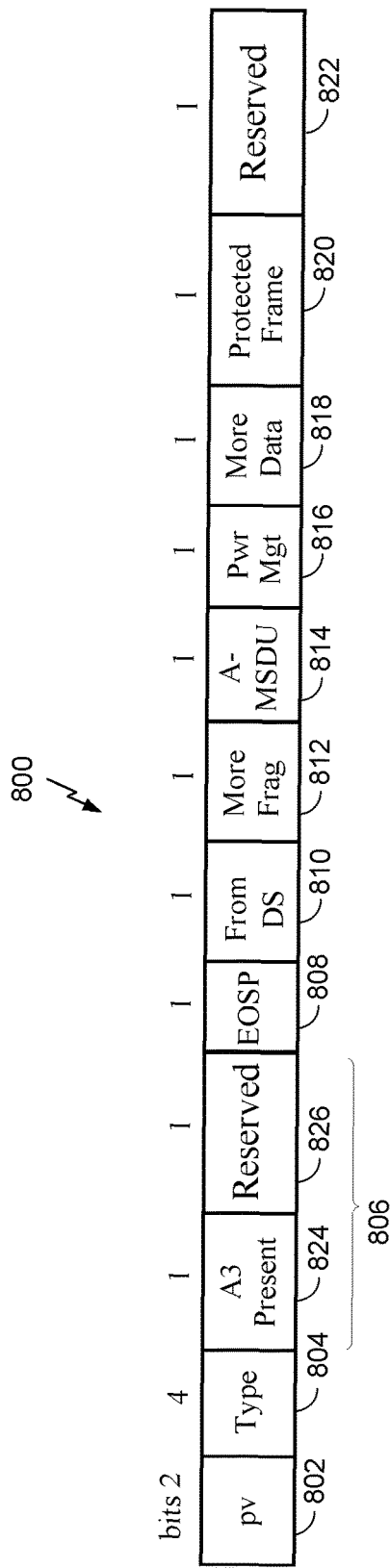

FIG. 8 illustrates another example of the type of information that may be stored in the reserved sub-fields 502, 506, 508, 514, and/or 522 of FIG. 5. As illustrated in FIG. 8, the fc field 800 includes the following sub-fields: a protocol version (pv) sub-field 802, a frame type (type) sub-field 804, an a3 present sub-field 824, a reserved sub-field 826, an eosp sub-field 808, a from-ds sub-field 810, a more frag sub-field 812, an A-MSDU sub-field 814, a Pwr Mgt sub-field 816, a more data sub-field 818, a pf sub-field 820, and a reserved sub-field 822. In the fc field 800, the pv sub-field 802, the eosp sub-field 808, and the A-MSDU sub-field 814 are stored in the reserved sub-fields 502, 508, and 514, respectively. The a3 present sub-field 824 is partially stored in the reserved sub-field 806, corresponding to the reserved sub-field 506 of FIG. 5. The reserved sub-field 522 remains reserved as reserved sub-field 822 in the fc field 800. Further, a single bit of the reserved sub-field 506 remains reserved as reserved sub-field 826 in the fc field 800. These reserved sub-fields may be replaced with other information as the need arises.

Figure 8A:
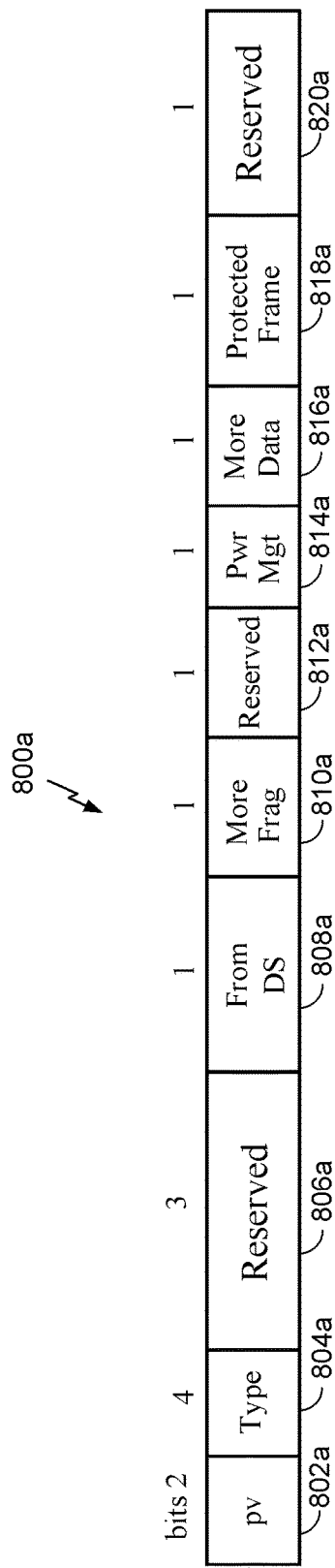

FIG. 8A illustrates another example of a fc field 800a. In some embodiments, the bits of the first reserved sub-field 806a may include a to-DS sub-field, a from-DS sub-field, and/or an a3 present sub-field. The bit of the reserved sub-field 812a may include a retry sub-field bit or an eosp sub-field bit. In one example, if the reserved sub-field 812a bit includes a retry bit, the bit of the last reserved sub-field 820a may include the eosp bit. In another example, if the bit of the reserved sub-field 812a includes the eosp bit, then the bit of the last reserved sub-field 820a may include an A-MSDU bit. In some embodiments, the last reserved sub-field 820a may include a more ppdu/rdg bit.

In general, the bits of the reserved sub-fields may be of any type that brings information to the receiver regarding the structure of the frame, or other additional information, that the transmitter intends to provide to the receiver.

In some embodiments, the first byte of the fc field may include bits carrying information about the structure of the packet or preamble, which may be used by the receiver to parse the received packet. For example, a pv sub-field, a type sub-field, a subtype sub-field, a from-DS sub-field, and/or a protected frame sub-field may be placed in the first byte so that after decoding the first byte, the receiver may already know all the necessary information for parsing the frame.

The use of different sub-fields illustrated in FIGS. 6-8 may be based on the different information that needs to be communicated to the different receiving devices of the data packets. For example, the wireless device 202r receiving the packet including the fc field 700 may not need the retry field to receive and process the data packet. As another example, the fc field 700 may indicate that an A-MSDU is present by setting the A-MSDU sub-field 714 to 1 in the event the data units are aggregated. In this case, an A-MSDU sub-field must be present in order for the device to process the frame. In some cases the receiver, such as wireless device 202r, may already have some of the information stored in memory that would be transmitted in a particular sub-field. The wireless device 202r may have received this information in a previously received data packet from the wireless device 202t or the wireless device 202r may have such information pre-programmed such as at the time of manufacture, or through communication with another device.

The frame control (fc) fields of compressed MAC headers may also be removed or modified in order to allow further compression of the MAC headers and thus allow for less space in a data packet to be used by the MAC header. FIGS. 9-14b illustrate examples of frame control (fc) fields of a compressed MAC header (e.g., MAC header 400).

Figure 9:
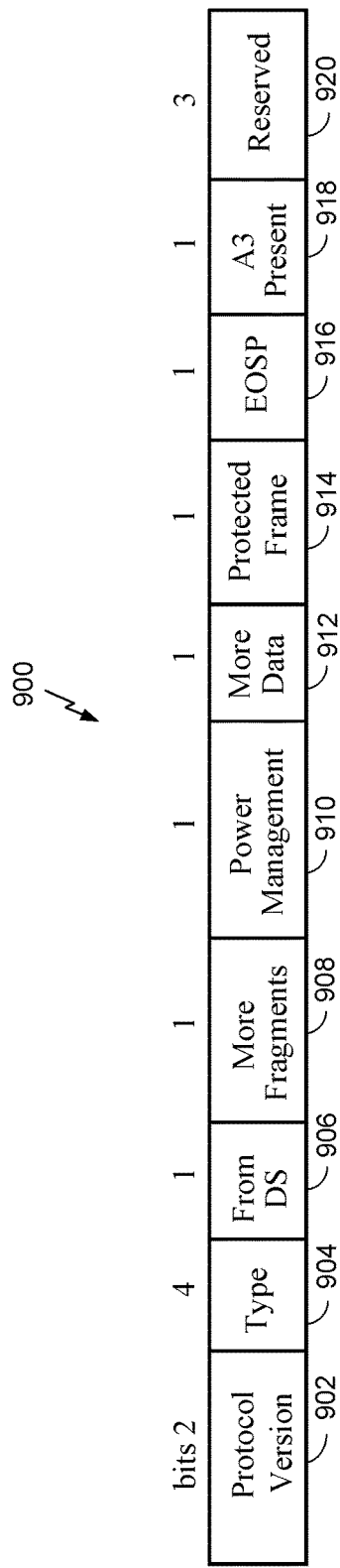
FIGS. 9-14e illustrate examples of frame control fields of compressed MAC headers.

FIG. 9 illustrates an example of a fc field 900 of a compressed MAC header. The fc field 900 includes the following sub-fields: a protocol version sub-field 902, a frame type (type) sub-field 904, a from distribution system (from-ds) sub-field 906, a more fragments sub-field 908, a power management sub-field 910, a more data sub-field 912, a protected frame (pf) sub-field 914, an end of service period sub-field 916, an a3 present sub-field 918, and a reserved sub-field 920. The reserved sub-field 920, as described above, may be reserved for storing information that is needed by the receiver of the frame in order to process the frame.

Figure 10:
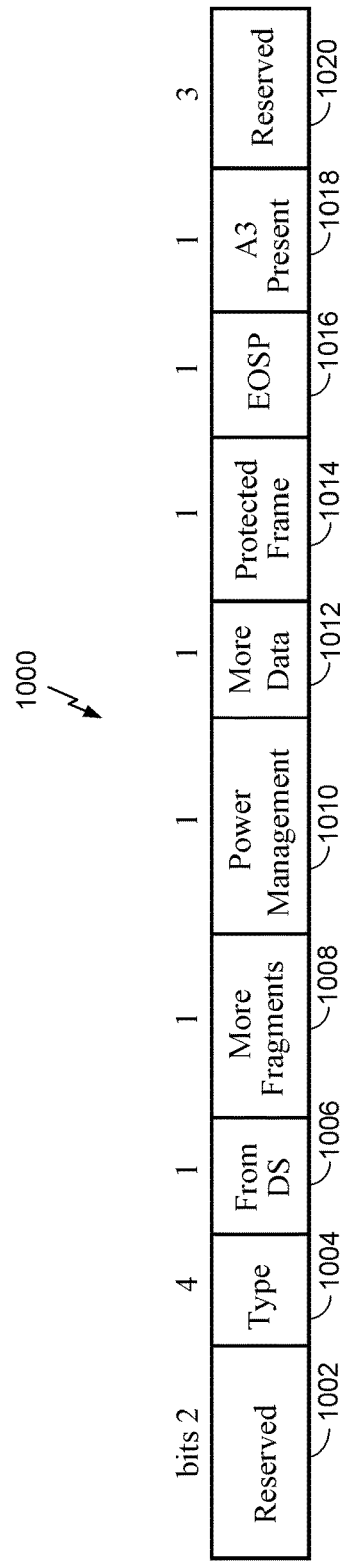

FIG. 10 illustrates another example of a fc field 1000 of a compressed MAC header. The fc field 1000 includes the following sub-fields: a reserved sub-field 1002, a frame type (type) sub-field 1004, a from distribution system (from-ds) sub-field 1006, a more fragments sub-field 1008, a power management sub-field 1010, a more data sub-field 1012, a protected frame (pf) sub-field 1014, an end of service period sub-field 1016, an a3 present sub-field 1018, and a reserved sub-field 1020. The reserved sub-fields 1002 and 1020 may be reserved for storing information that is needed by the receiver of the frame in order to process the frame, similar to the reserved fields described above.

Figure 11:
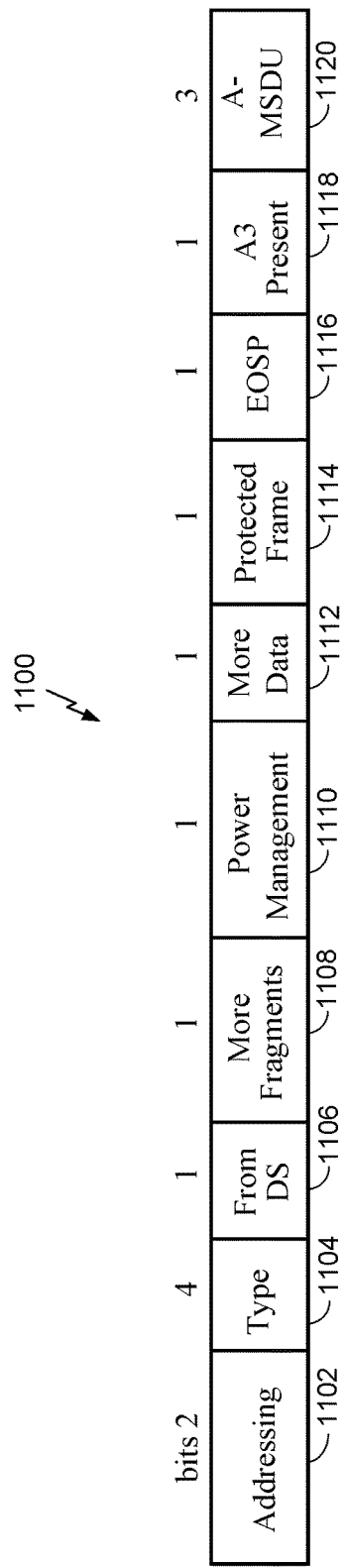

FIG. 11 illustrates another example of a fc field 1100 of a compressed MAC header. The fc field 1100 includes the following sub-fields: an addressing sub-field 1102, a frame type (type) sub-field 1104, a from distribution system (from-ds) sub-field 1106, a more fragments sub-field 1108, a power management sub-field 1110, a more data sub-field 1112, a protected frame (pf) sub-field 1114, an end of service period sub-field 1116, an a3 present sub-field 1118, and an A-MSDU sub-field 1120. The addressing sub-field 1102, for example, may be used to indicate whether the MAC header includes a local identifier, such as an access identifier (AID), and/or a globally unique identifier for a device (e.g., MAC address). For example, the addressing sub-field 1102 may be set to 0 to indicate that only an AID is included in the MAC header, or may be set to 1 to indicate that an AID and a globally unique identifier for a device is included.

Figure 12:
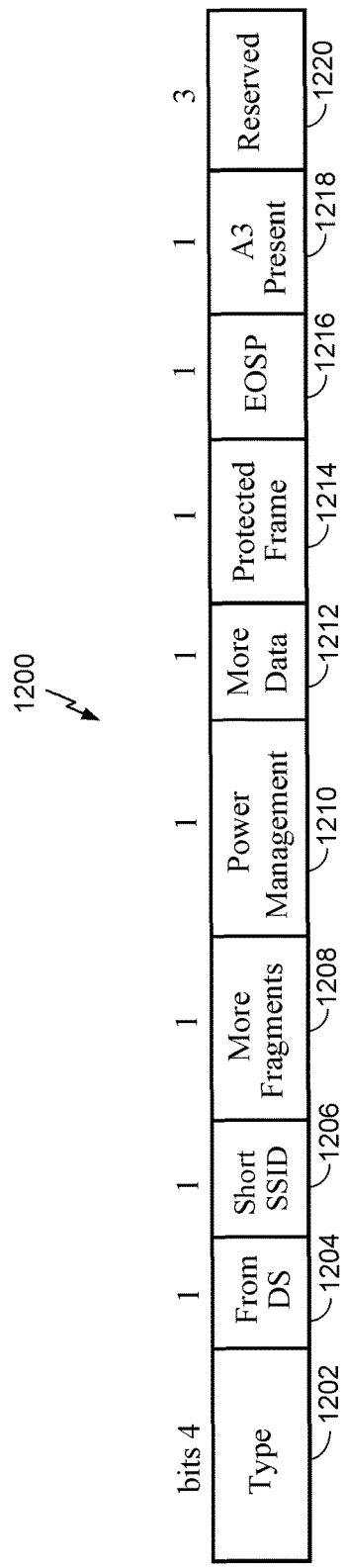
Figure 13:
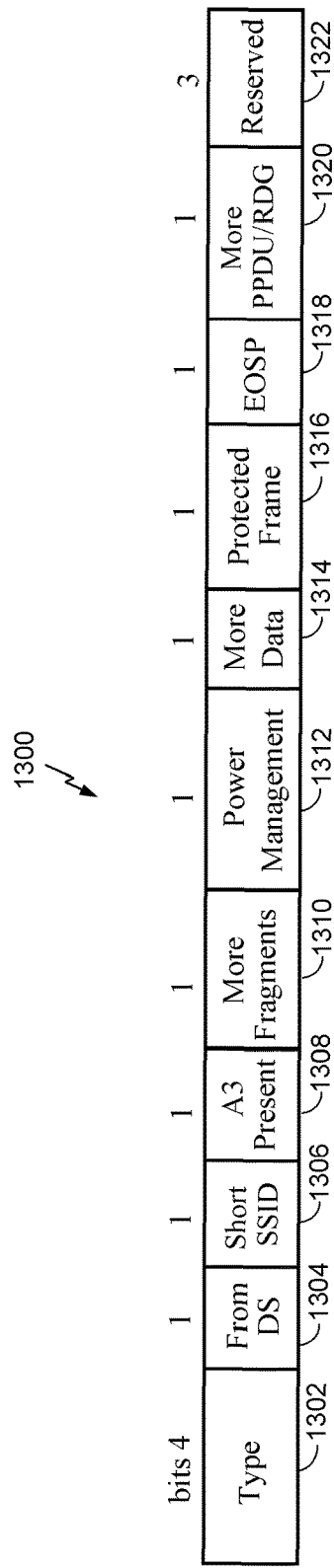

As discussed above, the pv sub-field of the fc field may be used to indicate whether a MAC header is a non-compressed MAC header or a compressed MAC header. For example, a value of 0 for the pv sub-field may indicate the MAC header is a non-compressed MAC header, and a value of 1 for the pv sub-field may indicate the MAC header is a compressed MAC header. The compressed MAC header may have the format of any of the compressed MAC headers described herein. However, the pv sub-field may not be needed or may not be supported by the network. FIGS. 12 and 13 illustrate examples of fc fields of a compressed MAC header without a protocol version (PV) sub-field.

FIG. 12 illustrates an example of a fc field 1200 of a compressed MAC header where a PV is not specified in the fc field. The fc field 1200 includes the following sub-fields: a frame type (type) sub-field 1202, a from distribution system (from-ds) sub-field 1204, a short SSID sub-field 1206, a more fragments sub-field 1208, a power management sub-field 1210, a more data sub-field 1212, a protected frame (pf) sub-field 1214, an end of service period sub-field 1216, an a3 present sub-field 1218, and a reserved sub-field 1220. The reserved sub-field 1220 may be reserved for storing information that is needed by the receiver of the frame in order to process the frame.

FIG. 13 illustrates another example of a fc field 1300 of a compressed MAC header where PV is not specified in the fc field. The fc field 1300 includes the following sub-fields: a frame type (type) sub-field 1302, a from distribution system (from-ds) sub-field 1304, a short SSID sub-field 1306, an a3 present sub-field 1308, a more fragments sub-field 1310, a power management sub-field 1312, a more data sub-field 1314, a protected frame (pf) sub-field 1316, an end of service period sub-field 1318, a more PPDU/RDG sub-field 1320, and a reserved sub-field 1322. The reserved sub-field 1322 may be reserved for storing information that is needed by the receiver of the frame in order to process the frame.

Figure 14A:
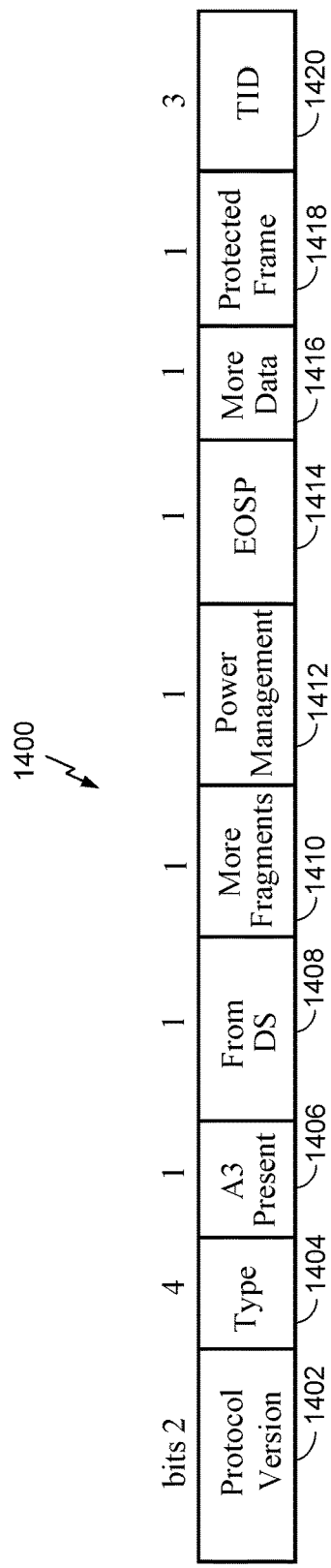

FIG. 14a illustrates another example of a fc field 1400 of a compressed MAC header. The fc field 1400 includes the following sub-fields in the following order: a protocol version sub-field 1402, a frame type (type) sub-field 1404, an a3 present sub-field 1406, a from distribution system (from-ds) sub-field 1408, a more fragments sub-field 1410, a power management sub-field 1412, an end of service period (eosp) sub-field 1414, a more data sub-field 1416, a protected frame (pf) sub-field 1418, and a traffic identifier (TID) sub-field 1420. In some aspects, the TID sub-field 1420 may be situated anywhere within the fc field 1400.

Figure 14B:
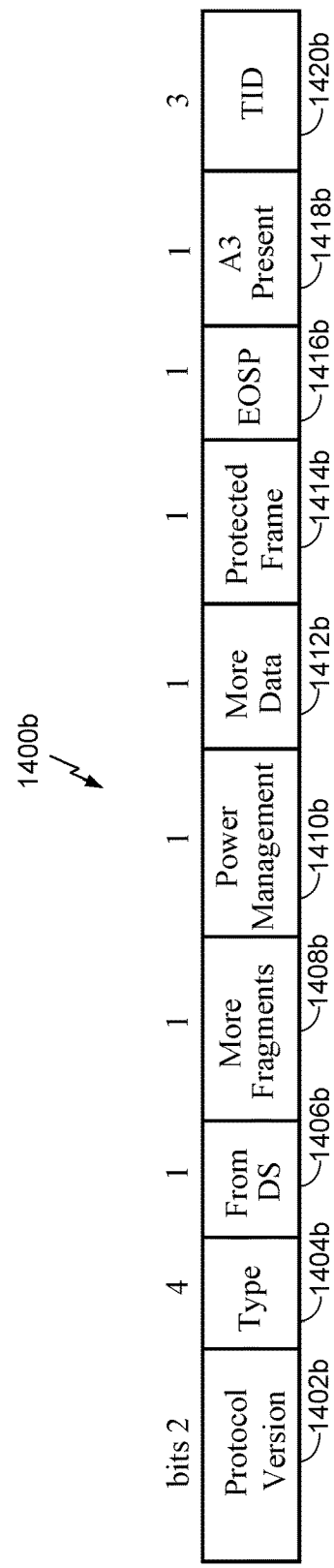

FIG. 14b illustrates another example of a fc field 1400b of a compressed MAC header. The fc field 1400b includes the following sub-fields in the following order: a protocol version sub-field 1402*b*, a frame type (type) sub-field 1404*b*, a from distribution system (from-ds) sub-field 1406*b*, a more fragments sub-field 1408*b*, a power management sub-field 1410*b*, a more data sub-field 1412*b*, a protected frame (pf) sub-field 1414*b*, an end of service period (eosp) sub-field 1416*b*, an a3 present sub-field 1418*b*, and a traffic identifier (TID) sub-field 1420*b*. In some aspects, the TID sub-field 1420*b* may be situated anywhere within the fc field 1400*b*.

In some aspects, the TID sub-fields 1420 and/or 1420*b* may be used to identify the traffic category or the traffic stream that applies to the corresponding service data unit (e.g., MSDU, A-MSDU), or fragment thereof, that is being transmitted and/or received. In some aspects, the TID sub-fields 1420 and/or 1420*b* may be used to also identify the traffic category or the traffic stream for which a transmission opportunity is being requested, through the setting of a transmission opportunity (TXOP) duration requested or a queue size.

In some aspects, the TID sub-fields 1420 and/or 1420*b* may include 3 bits or less instead of 4 bits. For example, only the three least significant bits of a full 4 bit TID may be included in the TID sub-fields 1420 and/or 1420*b*. In some aspects, the TID sub-fields 1420 and/or 1420*b* with a 3 bit TID including the three least significant bits of a full 4 bit TID may be used for enhanced distributed channel access (EDCA) for prioritizing different types of data, including background, best effort, video, and voice data. For example, values 0-7 may be used in the TID sub-field if EDCA is used. In some aspects, the first most significant bit of the TID may be stored at the receiver when hybrid coordinated function controlled channel access (HCCA) or HCC-EDCA mixed mode (HEMM) is used so that the values of 8-15 may be indicated by the TID sub-field. In some aspects, the first most significant bit of the TID may be indicated by a value of the type sub-field 1404 and/or 1404*b*. For example, a value of the type sub-field of 2 may indicate that HCCA or HEMM is used. As another example, a value of the type sub-field of 3 may indicate that EDCA is used. The remaining 3 LSB of the TID (the traffic class (tc)) can be either stored as a sub-field of the frame control field or as a sub-field of the S-ID, as described in more detail below.

Figure 14C:
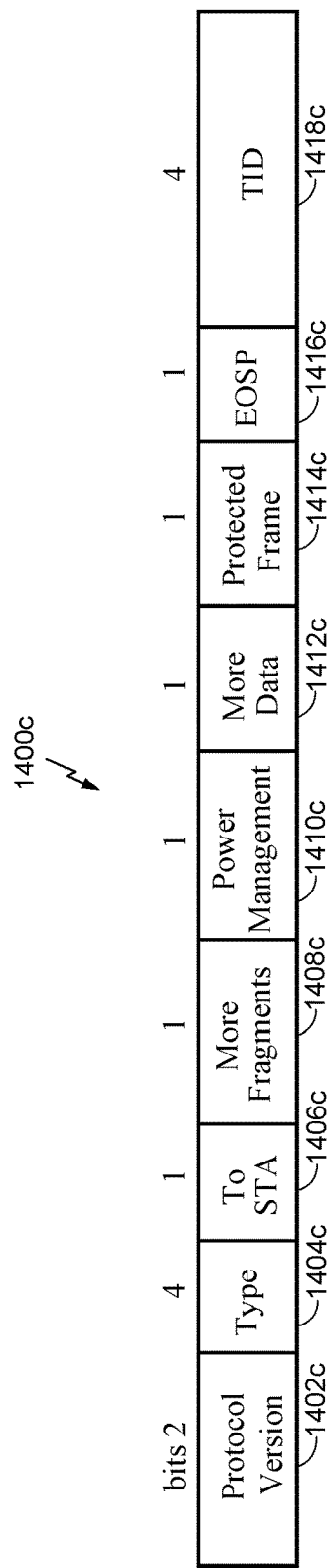

FIG. 14*c* illustrates another example of a fc field 1400*c* of a compressed MAC header. The fc field 1400*c* includes the following sub-fields in the following order: a protocol version sub-field 1402*c*, a frame type (type) sub-field 1404*c*, a to-station (STA) (to-STA) sub-field 1406*c*, a more fragments sub-field 1408*c*, a power management sub-field 1410*c*, a more data sub-field 1412*c*, a protected frame (pf) sub-field 1414*c*, an end of service period (eosp) sub-field 1416*c*, and a traffic identifier (TID) sub-field 1418*c*. In some aspects, the TID sub-field 1420*b* may be situated anywhere within the fc field 1400*c*.

The to-STA sub-field 1406*c* may be used in a manner similar to that of the from-ds sub-field 1408 and/or 1406*b*. For example, the to-STA sub-field 1406*c* may indicate that a frame is transmitted from an AP to an STA, from a STA to another STA, or from a STA to an AP. The bit value of the to-STA sub-field 1406*c* may be opposite the bit value of the from-ds sub-field 1408 and/or 1406*b*. For example, a bit value of 0 for the to-STA sub-field 1406*c* indicates the same information to the receiver of the frame as that of a 1 for a from-ds sub-field. Accordingly, any of the previously described from-ds sub-fields may be replaced with a to-STA sub-field with an opposite bit value as that of the from-ds sub-field. In some aspects, a 0 bit value for the to-STA sub-field 1406*c* may indicate that a data unit is transmitted from an AP to a STA or from another STA to the STA. In these aspects, an address 1 (a1) field of the MAC header may contain the MAC address of the receiver of the data unit (e.g., a MPDU), an address 2 (a2) field may include a short identifier (S-ID) (described below) that may contain the AID of the transmitter of the data unit, an address 3 (a3) field (if present) may contain the destination address of the data unit, and an address 4 (a4) field (if present) may contain the source address of the data unit. In some aspects, a 1 bit value for the to-STA sub-field 1406*c* may indicate that a data unit is transmitted from a STA to an AP. In these aspects, an a1 field of the MAC header may contain the AID of the receiver (e.g., in a S-ID field) of the data unit (e.g., a MPDU), an a2 field may contain the MAC address of the transmitter of the data unit, an a3 field (if present) may contain the source address of the data unit, and an address 4 (a4) field (if present) may contain the destination address of the data unit.

In some aspects the a3 field (if present) and/or a4 field (if present) may always contain the destination address and/or source address of the data unit, independent of the value of the From DS field (or equivalently of the From STA field). In some aspects the a3 field (if present) and/or a4 field (if present) may always contain the source address and/or destination address of the data unit, independent of the value of the From DS field (or equivalently of the From STA field). In some aspects, the TID sub-field 1418*c* may include 4 bits or less. For example, the TID sub-field 1418*c* may include 4 bits and may include an indication of a traffic class (tc) and an access category (ac). Access categories may include best effort, background, video, and voice traffic. The TID sub-field 1418*c* may be used to indicate to the MAC layer the appropriate ac for the data unit. As another example, the TID sub-field 1418*c* may include 3 bits that may represent the traffic class. As another example, the TID sub-field 1418*c* may include 2 bits that may represent the access category.

Figure 19:
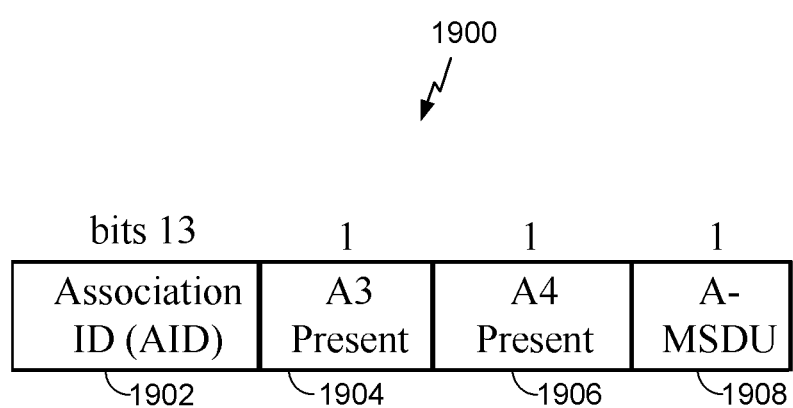
FIG. 19 illustrates an example of a short identifier field of a compressed MAC header.

As described above, there may be four address fields in the MAC frame. For example, these address fields may be used to indicate the recipient of the frame (a1), the transmitter of the frame (a2), and optionally the source and/or the destination of the frame (a3 and/or a4). In some aspects, the recipient of the frame (a1) or the transmitter of the frame (a2) may be identified by an AID sub-field located in a short ID (S-ID) field. Whether the a1 or the a2 field includes the AID may depend on the value of the to-STA sub-field (or the from-ds field) of the frame control field as described above. For example, if the to-STA sub-field is set to 0, the a1 field may include the AID and the a2 field may include the BSSID. As another example, if the to-STA sub-field is set to 1, the a2 field may include the AID and the a1 field may include the BSSID and/or the receiver address. FIG. 19 illustrates an example of a short ID (S-ID) field 1900 of a compressed MAC header. The S-ID field 1900 may be included in the a1 field or the a2 field of the MAC header. For example, the a1 and/or the a2 field may be assigned the AID 1902 at association, which may be included in the S-ID field 1900. In some aspects, the length of the S-ID field is 2 octets (16 bits). The S-ID field 1900 may further include an A3 present sub-field 1904, an A4 present sub-field 1906, and an A-MSDU sub-field 1908. The AID sub-field 1902 may include 13 bits, which leaves 3 bits remaining. The remaining 3 bits may be used to store the A3 present sub-field 1904, the A4 present sub-field 1906, and the A-MSDU sub-field 1908. Accordingly, the frame control field does not include these sub-fields.

In some aspects, the presence of A3, which is optional, is indicated by the A3 present sub-field 1904 and the presence of A4, which is also optional, is indicated by the A4 present sub-field 1906. In some aspects, when the A3 field is not present, A3 is either stored at the recipient of the frame or, if an A3 is not stored at the recipient of the frame, A3 is equal to A1. In some aspects, when the A4 field is not present, A4 is either stored at the recipient of the frame or, if an A4 is not stored at the recipient of the frame A4 is equal to A2. In some aspects, if the A-MSDU sub-field 1908 is set to 1, the MPDU contains a short A-MSDU. In some aspects, if the A-MSDU sub-field 1908 is set to 1, the MPDU contains an A-MSDU that carries multiple MSDUs, each of which has a source address and/or destination address and the addressing depends on a mapping similar to A4 present/A3 Present per each MSDU.

Referring again to FIG. 14*c*, other sub-fields of the fc may be included in the S-ID 1900. For example, as described above, the TID sub-field 1418*c* includes 4 bits. In some aspects, the first most significant bit of the TID sub-field 1418*c* may be used to indicate if hybrid coordinated function controlled channel access (HCCA) is used or if HCC-EDCA mixed mode (HEMM) is used. The remaining three least significant bits of the TID may be used to indicate the traffic class (tc) of the data unit. In some aspects, the tc may be stored in the S-ID field 1900 so that the remaining bits of the TID sub-field 1418*c* remain unused. In some aspects, these remaining unused bits in the frame control field may be used to store the A3 present sub-field, the A4 present sub-field, the A-MSDU sub-field, etc. One of skill will understand that any other sub-field of a frame control (fc) field may be stored in the S-ID field 1900. For example, the protected frame may be stored in the S-ID 1900 instead of in the fc field.

Figure 14D:
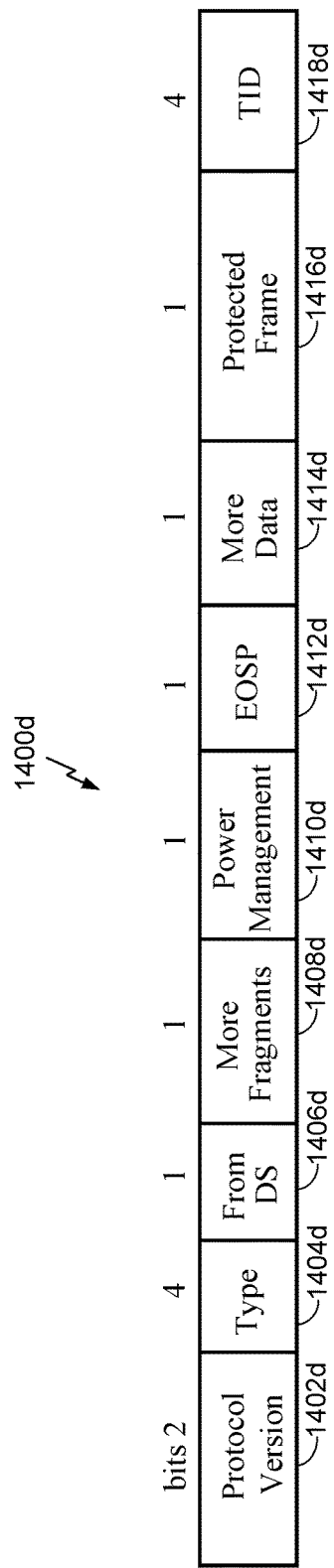

FIG. 14*d* illustrates another example of a fc field 1400*d* of a compressed MAC header. The fc field 1400*d* includes the following sub-fields in the following order: a protocol version sub-field 1402*d*, a frame type (type) sub-field 1404*d*, a from distribution system (from-ds) sub-field 1406*d*, a more fragments sub-field 1408*d*, a power management sub-field 1410*d*, an end of service period (eosp) sub-field 1412*d*, a more data sub-field 1414*d*, a protected frame (pf) sub-field 1416*d*, and a traffic identifier (TID) sub-field 1418*d*. In some aspects, the TID sub-field 1418*d* may be situated anywhere within the fc field 1400*d*. For example, the TID sub-field 1418*d* may be located immediately after the type sub-field 1404*d*. In some aspects, a to-STA sub-field may be used instead of the from-ds sub-field 1406*d*, as described above with respect to FIG. 14*c*. The fc field 1400*d* may be part of a compressed MAC header included in a data frame, a management frame, and/or a control frame.

In some aspects, the TID sub-field 1416*d* may include 4 bits. In some aspects, the TID sub-field 1416*d* includes 3 bits or less. For example, only the three least significant bits of a full 4 bit TID may be included in the TID sub-field 1416*b*, which in this case may represent the Traffic Class.

In some aspects, the fc field 1400*d* may be part of a compressed MAC header for management frames. For example, one value of the type field may identify a management type that uses a MAC header that includes global addresses (e.g., MAC addresses) in the a1 and a2 fields, and another management type may be identified by another value of the type field. This management type can use a MAC header that includes a global address (e.g., MAC addresses) in the a1 or a2 field and an AID in the other of the a1 or a2 field. In this example, the TID sub-field present in the frame control field may be reserved and may be used to define different management frame sub-types, such as Action frames, Action no Ack frames, etc. In some aspects, the fc field 1400*d* may be part of a compressed control frame. For example, one control type may be used to indicate a control frame that uses a MAC header that includes a global address (e.g., MAC addresses) in the a1 or a2 field and an AID in the other of the a1 or a2 field. Another control type may be used to indicate a control frame that uses two full MAC addresses for both a1 and a2. The TID sub-field of the frame control field of a control frame may be reserved and used to define different control frame sub-types, such as RTS, PS-Poll, CTS, etc. Table 1 includes an example of a table of type values that may be indicated by bit values of TID sub-field 1418*d* of a data frame, a management frame, and/or a control frame.

| Type | Type description |
|---|---|
| 0 | Single data MSDU or A-MSDU (a1 or a2 field includes an AID, as determined by the from-ds sub-field or the to-STA sub-field in the fc field) |
| 1 | Short Null (a1 or a2 contains an AID, as determined by the from-ds sub-field or the to-STA sub-field in the fc field) |
| 2 | Short Management (a1 or a2 contains an AID, as determined by the from-ds sub-field or the to-STA sub-field in the fc field, Management subtype in TID field of FC) |
| 3 | Short Control (a1 or a2 contains an AID, as determined by the from-ds sub-field or the to-STA sub-field in the fc field) |
| 4-11 | Reserved |
| 12 | Single data MSDU or A-MSDU (a1 and a2 contain a full MAC address) |
| 13 | Short Management (both a1 and a2 contain a full MAC address, Management subtype in TID field of fc) |
| 14 | Short Control (a1 or a2 contains an AID, as determined by the from-ds sub-field or the to-STA sub-field in the fc field) |
| 15 | Extension (reserved) |

Figure 14E:
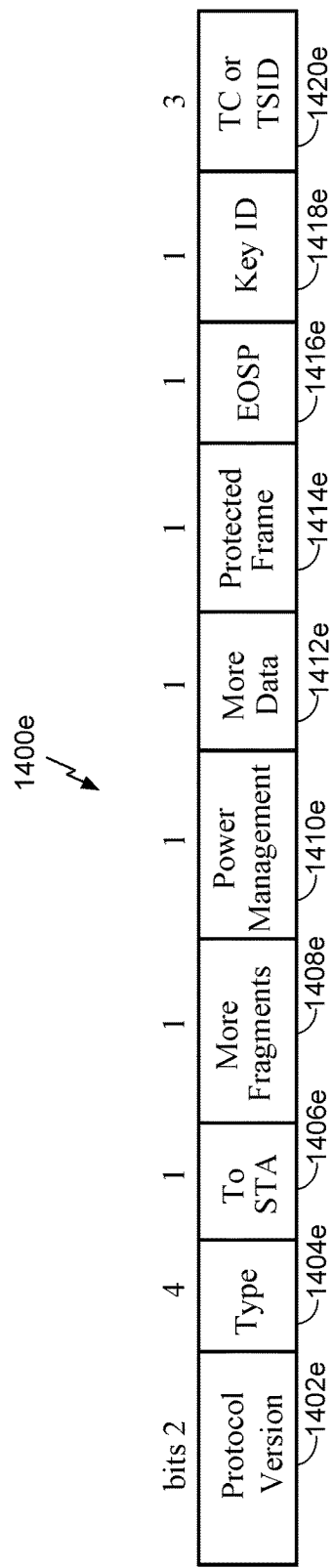

FIG. 14*e* illustrates another example of a fc field 1400*e* of a compressed MAC header. The fc field 1400*e* includes the following sub-fields in the following order: a protocol version sub-field 1402*e*, a frame type (type) sub-field 1404*e*, a to-station (STA) (to-STA) sub-field 1406*e*, a more fragments sub-field 1408*e*, a power management sub-field 1410*e*, a more data sub-field 1412*e*, a protected frame (pf) sub-field 1414*e*, an end of service period (eosp) sub-field 1416*e*, a key identifier (Key ID) sub-field 1418*e*, and a Traffic Class (TC) or Traffic Stream Identifier (TSID) sub-field 1420*e*. In some aspects, a from-ds sub-field may be used instead of the to-STA sub-field 1406*e*, as described above with respect to FIG. 14*c*. The fc field 1400*e* may be part of a compressed MAC header included in a data frame and/or a management frame.

As described above, the to-STA sub-field 1406*c* may be used in a manner similar to that of the from-ds sub-field 1408 and/or 1406*b*. For example, the to-STA sub-field 1406*c* may indicate that a frame is transmitted from an AP to an STA, from a STA to another STA, or from a STA to an AP.

In some aspects, Key ID sub-field 1418*e* may include 1 bit. In some aspects, if the protected frame sub-field 1414*e* is set to a value of 1 (indicating that the frame is protected), the Key ID sub-field 1418*e* may be used to indicate to the device receiving the MAC header the key ID that is used and/or to let the receiving device know that the encryption method, and/or the key, has changed. By including the key ID sub-field 1418*e* in the MAC header of a data unit, a CCMP header may be reduced or eliminated from the data unit. In some aspects, if the protected frame sub-field 1414e is set to a value of 0 (indicating that the frame is not protected), the Key ID sub-field 1418e may be reserved so that it can be used for other functions. For example, if the frame is a management frame, the Key ID sub-field 1418e may be reserved and may be used to define different management frame sub-types. The management frame sub-types may include an Action frame, an Action no Ack frame, and the like.

In some aspects, the TC or TSID sub-field 1420e may include 3 bits, which may be the three least significant bits of a TID sub-field. The sub-field 1420e may include a TC sub-field if enhanced distributed channel access (EDCA) is used, and may include a TSID sub-field if hybrid coordinated function controlled channel access (HCCA) is used. In some aspects, if the frame is a management frame, the most significant bit (MSB) of the TC or TSID sub-field 1420e (depending on whether EDCA or HCCA is used) may be used to indicate a sub-type of the management frame, such as Action frames, Action no Ack frames, and the like. In some aspects, the two least significant bits of the TC or TSID sub-field 1420e may be used to indicate access category (AC) of the frame, such as best effort, background, video, and voice traffic.

Table 2 includes an example of a table of type values that may be indicated by bit values of the type sub-field 1404e of a data frame, a management frame, and/or a control frame.

TABLE 2

| Type | Type description |
|---|---|
| 0 | EDCA MSDU<br>a1 or a2 is an S-ID, as determined by the To-STA (or From-DS) sub-field in the frame control (fc) field |
| 1 | EDCA A-MSDU<br>a1 or a2 is an S-ID, as determined by the To-STA (or From-DS) sub-field in the fc field |
| 2 | HCCA MSDU<br>a1 or a2 is an S-ID, as determined by the To-STA (or From-DS) sub-field in the fc field |
| 3 | HCCA A-MSDU<br>a1 or a2 is an S-ID, as determined by the To-STA (or From-DS) sub-field in the fc field |
| 4 | EDCA Management<br>a1 or a2 is an S-ID, as determined by the To-STA (or From-DS) sub-field in the fc field<br>Management sub-types is encoded in the MSB of the TC field<br>The AC is encoded in the 2 LSBs of the TC sub-field of the fc field |
| 5 | HCCA Management<br>a1 or a2 is an S-ID, as determined by the To-STA (or From-DS) sub-field in the fc field<br>Management sub-types is encoded in the MSB of the TSID field<br>The AC is encoded in the 2 LSBs of the TSID sub-field of the fc field |
| 6 | Short Control<br>a1 or a2 contains an SID, as determined by the To-STA (or From-DS) sub-field in the fc field<br>Control sub-types are encoded in the Key ID and TC subfields of the fc field) |
| 7-10 | Reserved |

TABLE 2-continued

| Type | Type description |
|---|---|
| 11 | EDCA Management group 1<br>both a1 and a2 contain a full MAC address<br>Management sub-types is encoded in the MSB of the TC sub-field of the fc field<br>The AC is encoded in the 2 LSBs of the TC sub-field of the fc field |
| 12 | EDCA Management group 2<br>both a1 and a2 contain a full MAC address<br>Management sub-types is encoded in the MSB of the TC sub-field of the fc field<br>The AC is encoded in the 2 LSBs of the TC sub-field of the fc field |
| 13 | HCCA Management group<br>both a1 and a2 contain a full MAC address<br>Management sub-types is encoded in the MSB of the TSID sub-field of the fc field<br>The AC is encoded in the 2 LSBs of the TSID sub-field of the fc field, |
| 14 | HCCA Management group 2<br>both a1 and a2 contain a full MAC address<br>Management sub-types is encoded in the MSB of the TSID sub-field of the fc field<br>The AC is encoded in the 2 LSBs of the TSID sub-field of the fc field, |
| 15 | Extension (currently reserved) |

As described above, the use of different sub-fields illustrated in FIGS. 9-14e of a compressed MAC header may be based on different information that needs to be communicated to the different receiving devices of the data packets. In some cases the receiver, such as wireless device 202r, may already have some of the information stored in memory that would be transmitted in a particular sub-field. The wireless device 202r may have received this information in a previously received data packet from the wireless device 202t or the wireless device 202r may have such information pre-programmed such as at the time of manufacture, or through communication with another device.

For any of the compressed MAC headers and modified control fields of the non-compressed and compressed MAC headers described herein, certain fields or sub-fields may further be added or modified to support certain additional features. In some aspects, an extended frame control (efc) field may be added to any of the compressed MAC headers described herein. The efc field may comprise 3 bits. The efc field may be the last 3 bits of an aid field of the compressed MAC header. The efc may be utilized to add information for new features. For example, in some aspects, an a3 present sub-field may be added to the fc field or another field (e.g., efc field) of the MAC header to indicate whether an a3 address ($3^{rd}$ address identifying a device) is included in the compressed MAC header. Additionally or alternatively, in some aspects, quality of service (QoS) subfields that indicate the value of certain QoS parameters are added to the fc field or another field of the MAC header (e.g., efc field), such as an access control (ac) sub-field, an end of service period (eosp) sub-field (as described above), an a-msdu sub-field (as described above), and/or a queue size sub-field. Additionally or alternatively, in some aspects, an ACK policy sub-field may be moved to the SIG field of the compressed MAC header. Additionally or alternatively, in some aspects, an a4 sub-field may be added to the fc field or another field (e.g., efc field) of the MAC header to indicate whether the packet is to be relayed. The a4 sub-field may be 1 bit. It should be noted that any combination of these fields may used in any of the compressed MAC headers described herein to support the features of the fields.

It is to be understood that the methods and techniques discussed above can also be employed for other types of frames without departing from the scope of the invention. For example, the methods and techniques discussed above can also be used for management/controls frames (e.g., RTS/CTS frames).

Figure 15:
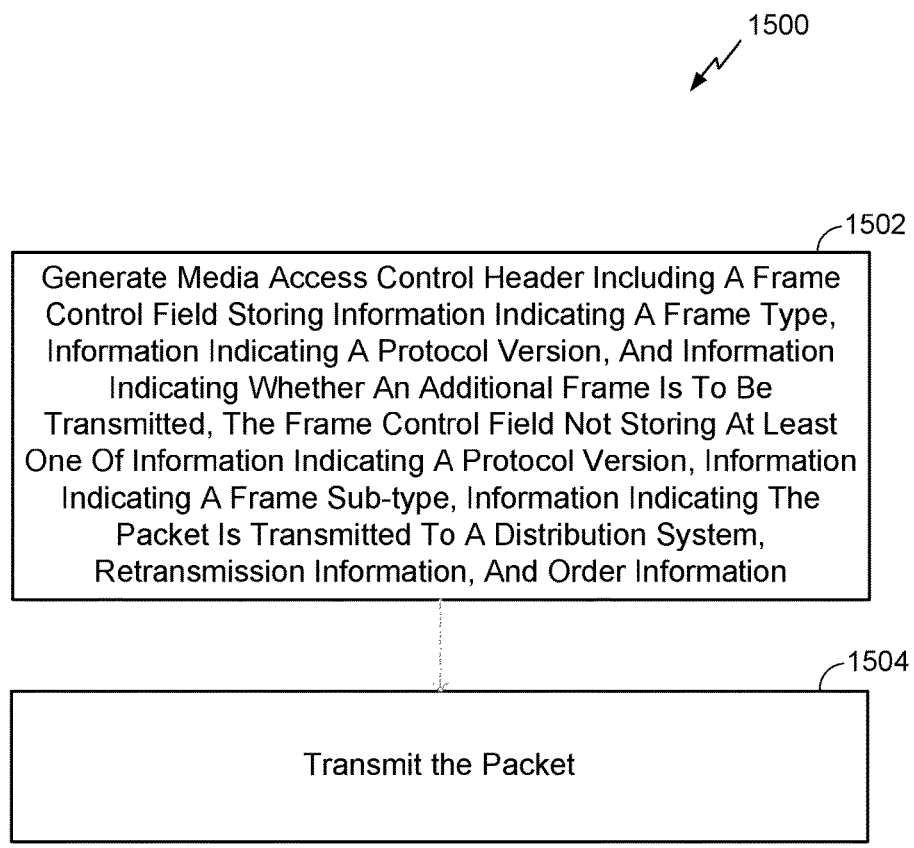
FIG. 15 illustrates an aspect of a method of generating a packet including a frame comprising a medium access control header.

FIG. 15 illustrates an aspect of a method 1500 for transmitting a packet with a MAC header. The method 1500 may be used to selectively generate the packet with any one of the MAC headers and frame control fields illustrated in FIGS. 3 and 5-14e, or another suitable control field or MAC header based on the teachings herein. The packet may be generated at either the AP 104 or the STA 106 and transmitted to another node in the wireless network 100. Although the method 1500 is described below with respect to elements of the wireless device 202t, those having ordinary skill in the art will appreciate that other components may be used to implement one or more of the steps described herein.

Initially, the frame control field to include in the MAC header of the packet may be selected from a plurality of types based on the type of information that needs to be communicated to the receiving device, as discussed above. The selection may be performed by the processor 204 and/or the DSP 220, for example.

Next, the medium access control (MAC) header is generated along with the rest of the packet. The packet may comprise the MAC header and a payload. The MAC header includes a frame control field that does not store certain types of information that may be stored in a frame control field of a non-compressed MAC header. For example, at block 1502, the method 1500 includes generating the MAC header including a frame control field storing information indicating a frame type, information indicating a protocol version, and information indicating whether an additional frame is to be transmitted, the frame control field not storing at least one of information indicating a frame sub-type, information indicating the packet is transmitted to a distribution system, retransmission information, and order information. In some embodiments, the frame control field may not store at least one of information indicating a protocol version (e.g., protocol version sub-field 372), information indicating a frame sub-type (e.g., subtype sub-field 376), information indicating that the packet is transmitted to a distribution system (e.g., To-DS sub-field 378), retransmission information (e.g., retry sub-field 384), and order information (e.g., order sub-field 392a). In some embodiments, the frame control field may store or may not store information as described above with respect to FIGS. 6-14e. The generation may be performed by the processor 204 and/or the DSP 220, for example.

Thereafter, at block 1504, the method 1500 includes transmitting the packet. The transmission may be performed wirelessly by the transmitter 210, for example.

Figure 16:
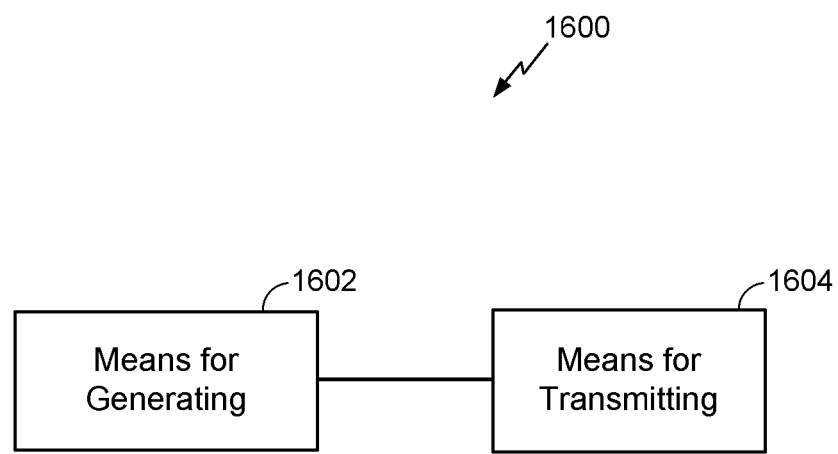
FIG. 16 is a functional block diagram of another exemplary wireless device that may be employed within the wireless communication system of FIG. 1.

FIG. 16 is a functional block diagram of another exemplary wireless device 1600 that may be employed within the wireless communication system 100. The device 1600 may comprise a means for selecting (not shown) a frame control field to include in the MAC header from a plurality of types based on the type of information that needs to be communicated to the receiving device, as discussed above. The means for selecting may be configured to perform one or more of the functions discussed above with respect to FIG. 15. The means for selecting may correspond to one or more of the processor 204 and the DSP 220. The device 1600 further comprises a means for generating 1602 the MAC header and the rest of the packet. The means for generating 1602 may be configured to perform one or more of the functions discussed above with respect to the block 1502 illustrated in FIG. 15. The means for generating 1602 may correspond to one or more of the processor 204 and the DSP 220. The device 1600 further comprises a means for transmitting 1604 for transmitting the generated packet. The means for transmitting 1604 may be configured to perform one or more of the functions discussed above with respect to the block 1504 illustrated in FIG. 15. The means for transmitting 1604 may correspond to the transmitter 210.

Figure 17:
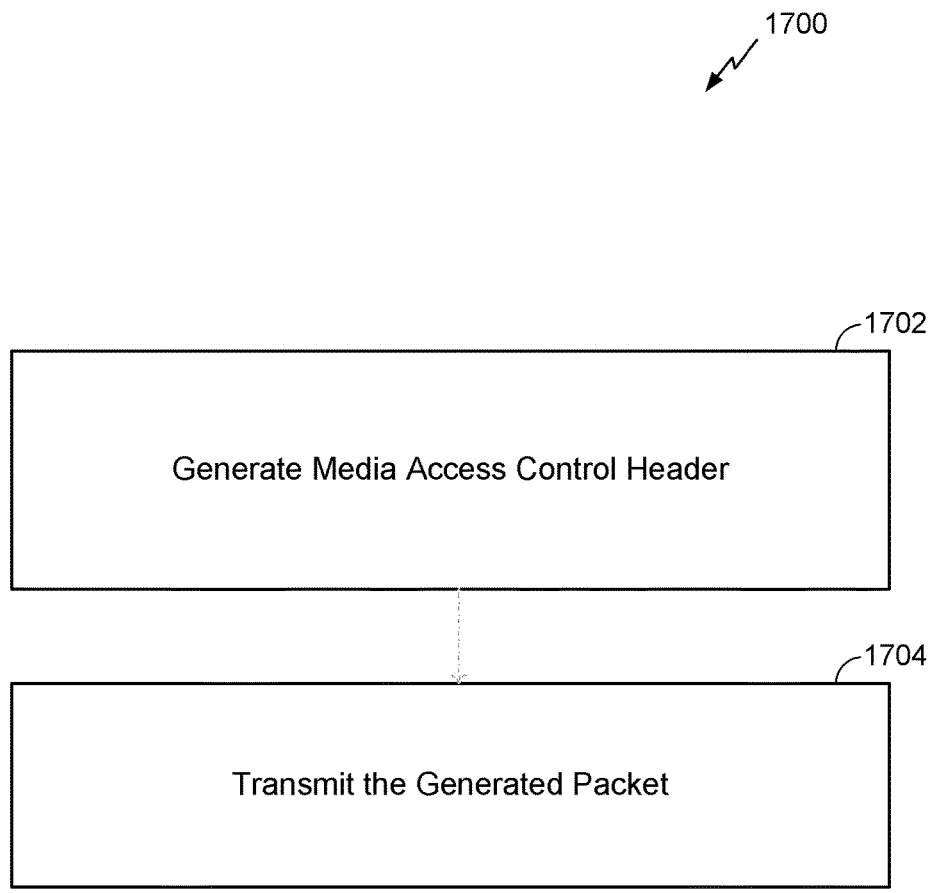
FIG. 17 illustrates an aspect of another method of generating a packet including a frame comprising a medium access control header.

FIG. 17 illustrates an aspect of a method 1700 for transmitting a packet with a MAC header. The method 1700 may be used to selectively generate the packet with any one of the MAC headers and frame control fields illustrated in FIGS. 4 and 9-14e, or another suitable control field or MAC header based on the teachings herein. The packet may be generated at either the AP 104 or the STA 106 and transmitted to another node in the wireless network 100. Although the method 1700 is described below with respect to elements of the wireless device 202t, those having ordinary skill in the art will appreciate that other components may be used to implement one or more of the steps described herein.

Initially, the frame control field to include in the MAC header of the packet may be selected from a plurality of types based on the type of information that needs to be communicated to the receiving device, as discussed above. The selection may be performed by the processor 204 and/or the DSP 220, for example.

Next, at block 1702, the medium access control (MAC) header is generated along with the rest of the packet. The packet may comprise the MAC header and a payload. The MAC header includes a frame control field that stores information indicating an end of a service period and information indicating if a destination address is present in the packet. The frame control field may also store other information as described above with respect to FIGS. 9-14e.

Thereafter, at block 1704, the packet is transmitted. The transmission may be performed wirelessly by the transmitter 210, for example.

Figure 18:
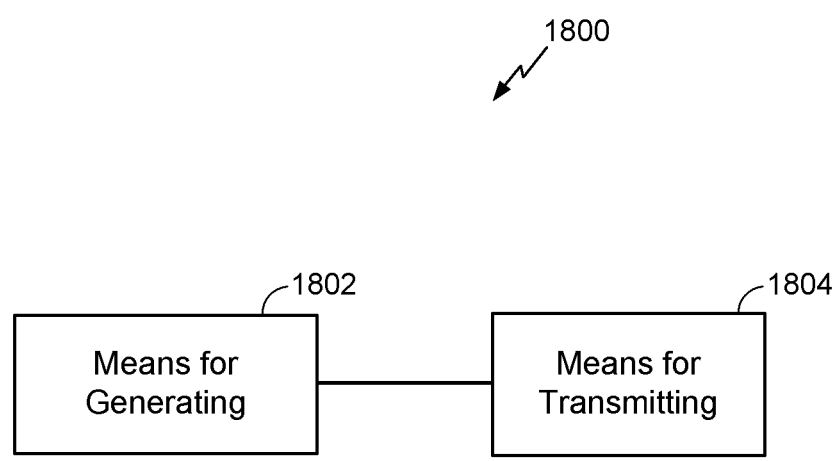
FIG. 18 is a functional block diagram of another exemplary wireless device that may be employed within the wireless communication system of FIG. 1.

FIG. 18 is a functional block diagram of another exemplary wireless device 1800 that may be employed within the wireless communication system 100. The device 1800 may comprise a means for selecting (not shown) a frame control field to include in the MAC header from a plurality of types based on the type of information that needs to be communicated to the receiving device, as discussed above. The means for selecting may be configured to perform one or more of the functions discussed above with respect to FIG. 17. The means for selecting may correspond to one or more of the processor 204 and the DSP 220. The device 1800 further comprises a means for generating 1802 the MAC header and the rest of the packet. The means for generating 1802 may be configured to perform one or more of the functions discussed above with respect to the block 1702 illustrated in FIG. 17. The means for generating 1802 may correspond to one or more of the processor 204 and the DSP 220. The device 1800 further comprises a means for transmitting 1804 for transmitting the generated packet. The means for transmitting 1804 may be configured to perform one or more of the functions discussed above with respect to the block 1704 illustrated in FIG. 17. The means for transmitting 1804 may correspond to the transmitter 210.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of generating a packet including a frame comprising a medium access control header, the method comprising:
   generating the medium access control header including a frame control field for use in each of a control frame, a management frame, and a data frame, the frame control field having:
      a type field storing information indicating the frame is the control frame, the management frame, or the data frame,
      a protocol version field storing information indicating a protocol version of the frame, and
      a field having a length of three (3) bits and:
         when the type field indicates the frame is the data frame, the field storing information indicating three (3) least significant bits (LSBs) of a traffic identifier (TID),
         when the type field indicates the frame is the control frame, the field storing information indicating a subtype of the control frame, and
         when the type field indicates the frame is the management frame, the field storing information indicating a subtype of the management frame, a non-zero value in the protocol version field indicating that the medium access control header is a compressed medium access control header; and
   transmitting the packet.

2. The method of claim 1, the frame control field further storing information indicating whether the packet is transmitted from a distribution system.

3. The method of claim 2, wherein the information indicating whether the packet is transmitted from the distribution system is included in a from-distribution system sub-field.

4. The method of claim 1, the frame control field further storing information indicating a power management state.

5. The method of claim 1, the frame control field further storing information indicating whether an additional frame is to be transmitted.

6. The method of claim 1, the frame control field further storing information indicating whether frame protection is present.

7. The method of claim 1, the frame control field further storing information indicating if a destination address is present in the packet.

8. The method of claim 1, the frame control field further storing information indicating an identification of a network service set.

9. The method of claim 8, wherein the information indicating an identification of a network service set is included in a short service set identifier sub-field.

10. The method of claim 8, wherein the identification of the network service set includes a hash of a short service set identifier.

11. The method of claim 1, the frame control field further storing information indicating an end of a service period.

12. The method of claim 1, the frame control field further storing retransmission information indicating whether the frame is being retransmitted.

13. The method of claim 1, the frame control field further storing information indicating one of whether additional sub-frames are to be transmitted and whether a reverse direction is granted.

14. The method of claim 13, wherein the information indicating one of whether additional sub-frames are to be transmitted and whether a reverse direction is granted is included in a sub-field.

15. The method of claim 1, the frame control field further storing information indicating an aggregated service data unit.

16. The method of claim 15, wherein the information indicating an aggregated service data unit is included in an aggregated medium access control level service data unit sub-field.

17. The method of claim 1, wherein the traffic identifier indicates a traffic class of a data unit included in the packet.

18. The method of claim 1, wherein the frame control field is generated to include a sub-field indicating whether enhanced distributed channel access (EDCA), hybrid coordinated controlled channel access (HCCA), or hybrid coordinator function (HCF) controlled channel access)-(HCCA) enhanced distributed channel access (EDCA) mixed mode (HEMM) is used.

19. The method of claim 1, wherein the field indicates the management frame is one of an Action frame or an Action no Ack frame.

20. An apparatus configured to generate a packet including a frame comprising a medium access control header, the apparatus comprising:
   a processor configured to generate the medium access control header including a frame control field for use in each of a control frame, a management frame, and a data frame, the frame control field having:
      a type field storing information identifying the frame is the control frame, the management frame, or the data frame,
      a protocol version field storing information indicating a protocol version of the frame, and
      a field having a length of three (3) bits and:
         when the type field indicates the frame is the data frame, the field storing information indicating three (3) least significant bits (LSBs) of a traffic identifier (TID),
         when the type field indicates the frame is the control frame, the field storing information indicating a subtype of the control frame, and
         when the type field indicates the frame is the management frame, the field storing information a subtype of the management frame, a non-zero value in the protocol version field indicating that the medium access control header is a compressed medium access control header; and
   a transmitter configured to transmit the packet.

21. The apparatus of claim 20, the frame control field further storing information indicating whether the packet is transmitted from a distribution system.

22. The apparatus of claim 21, wherein the information indicating whether the packet is transmitted from the distribution system is included in a from-distribution system sub-field.

23. The apparatus of claim 20, the frame control field further storing information indicating a power management state.

24. The apparatus of claim 20, the frame control field further storing information indicating whether an additional frame is to be transmitted.

25. The apparatus of claim 20, the frame control field further storing information indicating whether frame protection is present.

26. The apparatus of claim 20, the frame control field further storing information indicating if a destination address is present in the packet.

27. The apparatus of claim 20, the frame control field further storing information indicating an identification of a network service set.

28. The apparatus of claim 27, wherein the information indicating an identification of a network service set is included in a short service set identifier sub-field.

29. The apparatus of claim 27, wherein the identification of the network service set includes a hash of a short service set identifier.

30. The apparatus of claim 20, the frame control field further storing information indicating an end of a service period.

31. The apparatus of claim 20, the frame control field further storing retransmission information indicating whether the frame is being retransmitted.

32. The apparatus of claim 20, the frame control field further storing information indicating one of whether additional sub-frames are to be transmitted and whether a reverse direction is granted.

33. The apparatus of claim 32, wherein the information indicating one of whether additional sub-frames are to be transmitted and whether a reverse direction is granted is included in a sub-field.

34. The apparatus of claim 20, the frame control field further storing information indicating an aggregated service data unit.

35. The apparatus of claim 34, wherein the information indicating an aggregated service data unit is included in an aggregated medium access control level service data unit sub-field.

36. An apparatus configured to generate a packet including a frame comprising a medium access control header, the apparatus comprising:
   means for generating the medium access control header including a frame control field for use in each of a control frame, a management frame, and a data frame, the frame control field having:
      a type field storing information indicating the frame is the control frame, the management frame, or the data frame,
      a protocol version field storing information indicating a protocol version, and
      a field having a length of three (3) bits and:
         when the type field indicates the frame is the data frame, the field storing information indicating three (3) least significant bits (LSBs) of a traffic identifier (TID),
         when the type field indicates the frame is the control frame, the field storing information indicating a subtype of the control field, and
         when the type field indicates the frame is the management frame, the field storing information indicating a subtype of the control field, a non-zero value in the protocol version field indicating that the medium access control header is a compressed medium access control header; and
   means for transmitting the packet.

37. The apparatus of claim 36, the frame control field further storing information indicating whether the packet is transmitted from a distribution system.

38. The apparatus of claim 37, wherein the information indicating whether the packet is transmitted from the distribution system is included in a from-distribution system sub-field.

39. The apparatus of claim 36, the frame control field further storing information indicating a power management state.

40. The apparatus of claim 36, the frame control field further storing information indicating whether an additional frame is to be transmitted.

41. The apparatus of claim 36, the frame control field further storing information indicating whether frame protection is present.

42. The apparatus of claim 36, the frame control field further storing information indicating if a destination address is present in the packet.

43. The apparatus of claim 36, the frame control field further storing information indicating an identification of a network service set.

44. The apparatus of claim 43, wherein the information indicating an identification of a network service set is included in a short service set identifier sub-field.

45. The apparatus of claim 43, wherein the identification of the network service set includes a hash of a short service set identifier.

46. The apparatus of claim 36, the frame control field further storing information indicating an end of a service period.

47. The apparatus of claim 36, the frame control field further storing retransmission information indicating whether the frame is being retransmitted.

48. The apparatus of claim 36, the frame control field further storing information indicating one of whether additional sub-frames are to be transmitted and whether a reverse direction is granted.

49. The apparatus of claim 48, wherein the information indicating one of whether additional sub-frames are to be transmitted and whether a reverse direction is granted is included in a sub-field.

50. The apparatus of claim 36, the frame control field further storing information indicating an aggregated service data unit.

51. The apparatus of claim 50, wherein the information indicating an aggregated service data unit is included in an aggregated medium access control level service data unit sub-field.

52. A non-transitory computer-readable medium comprising instructions that when executed by a computer cause the computer to perform a method of communicating in a wireless network, the method comprising:
   generating a packet including a frame comprising a medium access control header including a frame control field for use in each of a control frame, a management frame, and a data frame, the frame control field having:
      a type field storing information indicating the frame is the data frame, the management frame, or the control frame,
      a protocol version field storing information indicating a protocol version of the frame, and
      a field having a length of three (3) bits and:
         when the type field indicates the frame is the data frame, the field storing information indicating three (3) least significant bits (LSBs) of a traffic identifier (TID), and when the type field indicates the frame is the control frame, the field storing information indicating a subtype of the control frame, and when the type field is the management frame, the field storing information a subtype of the management frame, a non-zero value in the protocol version field indicating that the medium access control header is a compressed medium access control header; and transmitting the packet.

53. The computer-readable medium of claim 52, the frame control field further storing information indicating whether the packet is transmitted from a distribution system.

54. The computer-readable medium of claim 53, wherein the information indicating whether the packet is transmitted from the distribution system is included in a from-distribution system sub-field.

55. The computer-readable medium of claim 52, the frame control field further storing information indicating a power management state.

56. The computer-readable medium of claim 52, the frame control field further storing information indicating whether an additional frame is to be transmitted.

57. The computer-readable medium of claim 52, the frame control field further storing information indicating whether frame protection is present.

58. The computer-readable medium of claim 52, the frame control field further storing information indicating if a destination address is present in the packet.

59. The computer-readable medium of claim 52, the frame control field further storing information indicating an end of a service period.

60. The computer-readable medium of claim 52, the frame control field further storing retransmission information indicating whether the frame is being retransmitted.

61. The computer-readable medium of claim 52, the frame control field further storing information indicating one of whether additional sub-frames are to be transmitted and whether a reverse direction is granted.

62. The computer-readable medium of claim 61, wherein the information indicating one of whether additional sub-frames are to be transmitted and whether a reverse direction is granted is included in a sub-field.

63. The computer-readable medium of claim 52, the frame control field further storing information indicating an aggregated service data unit.

64. The computer-readable medium of claim 63, wherein the information indicating an aggregated service data unit is included in an aggregated medium access control level service data unit sub-field.

* * * * *